United States Patent
Liebich et al.

(10) Patent No.: US 7,584,213 B2
(45) Date of Patent: Sep. 1, 2009

(54) METHOD AND COMPUTER SYSTEM FOR GRAPHICAL ASSIGNMENTS IN HIERARCHIES

(75) Inventors: Gunther Liebich, Walldorf (DE); Roman Rapp, Antibes (FR)

(73) Assignee: SAP AG, Walldorf (DE)

( * ) Notice: Subject to any disclaimer, the term of this patent is extended or adjusted under 35 U.S.C. 154(b) by 305 days.

(21) Appl. No.: 10/482,840

(22) PCT Filed: Jun. 5, 2002

(86) PCT No.: PCT/EP02/06162
§ 371 (c)(1),
(2), (4) Date: Jan. 6, 2004

(87) PCT Pub. No.: WO02/101575
PCT Pub. Date: Dec. 19, 2002

(65) Prior Publication Data
US 2005/0091252 A1    Apr. 28, 2005

(30) Foreign Application Priority Data
Jun. 8, 2001    (EP) ................... 01113949

(51) Int. Cl.
*G06F 7/00*    (2006.01)
(52) U.S. Cl. ............ 707/104.1; 707/1; 707/2; 707/100; 715/712; 715/713
(58) Field of Classification Search .......... 715/853, 715/762, 712, 713; 707/102, 100, 101, 104.1, 707/1, 2
See application file for complete search history.

(56) References Cited

U.S. PATENT DOCUMENTS 4,821,211 A * 4/1989 Torres ................. 715/853

(Continued)

FOREIGN PATENT DOCUMENTS

EP    1331553 A1    7/2003

(Continued)

OTHER PUBLICATIONS

European Search Report and Communication, for European Application No. 04006187.1-2211, dated Feb. 4, 2004 (9 pages).

(Continued)

*Primary Examiner*—Hung Q Pham
(74) *Attorney, Agent, or Firm*—SAP/Finnegan, Henderson, Farabow, Garrett & Dunner LLP

(57) ABSTRACT

Computer-implemented method, computer system and computer program product for creating graphical assignments between objects. An object hierarchy (110) and an object type selector (130) are displayed on an output device. The object type selector (130) provides a plurality of predefined object types (131-134). A rule database stores for each object type at least one predefined object type assignment. A first object (111) is inserted (438) into the object hierarchy (110) in accordance with one of the object type assignments, wherein the first object (111) has a first object type (131) and is graphically assigned to a second object (112) having a second object type (132). An object type can result from a combination of a predefined object type (134) with an object instance of any predefined object type. Graphical assignments between objects of at least two object hierarchies can also be created.

20 Claims, 21 Drawing Sheets

U.S. PATENT DOCUMENTS

| | | | |
|---|---|---|---|
| 5,542,086 | A | 7/1996 | Andrew et al. |
| 5,710,894 | A | 1/1998 | Maulsby et al. |
| 5,886,699 | A * | 3/1999 | Belfiore et al. .............. 715/843 |
| 5,917,492 | A * | 6/1999 | Bereiter et al. .............. 715/854 |
| 6,115,044 | A | 9/2000 | Alimpich et al. |
| 6,559,871 | B1 * | 5/2003 | Brozowski et al. .......... 715/853 |
| 6,636,250 | B1 * | 10/2003 | Gasser ....................... 715/853 |
| 2003/0079182 | A1 | 4/2003 | Hofmann |
| 2005/0091252 | A1 | 4/2005 | Liebich et al. |
| 2006/0015851 | A1 | 1/2006 | Poole |
| 2006/0036568 | A1 | 2/2006 | Moore et al. |

FOREIGN PATENT DOCUMENTS

EP          1376323 A1       1/2004

OTHER PUBLICATIONS

U.S. Appl. No. 11/100,515 for Methods and Systems for Entering Object Assignments, filed Apr. 7, 2005.

Dewan, Prasun, "An Inheritance Model for Supporting Flexible Displays of Data Structures", Software and Practice Experience, John Wiley & Sons Ltd., Chichester, Sussex, Great Britain, vol. 21, No. 7, Jul. 1, 1991, pp. 719-738.

Dewan, Prasun,: "An Inheritance Model For Supporting Flexible Displays Of Data Structures" Software Practice & Experience, John Wiley & Sons Ltd. Chichester, Sussex, Great Britain, vol. 21, No. 7, Jul. 1, 1991, pp. 719-738.

ABC Technologies Inc., "OROS ABCPlus User's Guide," ABC Technologies Inc., 1998, pp. 83-94.

Dawn J. Sedgley et al., *The 123's of ABC in SAP, Using SAP R/3 to Support Activity-Based Costing*, Wiley Publishing, 2001, pp. v-xiii; ch. 2, 4, and 10; Index.

Various Screenshots from the Oros 99 Version 4.3 program (15 pgs).

ABC Technologies Inc. & SAP AG, "White Paper: Oros Bridge 5.0 with SAP: Interfacing ABC Information," 1999 (18 pgs. filed under seal).

ABC Technologies Inc. & SAP AG, "Technical Paper: Building Oros and SAP R/3 Compatible Models in Detail," 1999 (43 pgs. filed under seal).

SAP AG, "R/3 System; The R/3-Oros Integration," Oct. 1998 (17 pgs.).

ABC Technologies Inc. & SAP AG, "Create Activity Module" presentation (20 pgs.).

Jörge Funke, SAP AG, "Activity-Based Budgeting with ABC Technologies Oros and SAP-SEM™," May 2001 (33 pgs.).

SAP AG, "Activity-Based Management," Jun. 2001 (2 pgs.).

SAP AG, "Linking SAP's SEM-BPS with ABC Technologies' Oros, Specification," May 2000 (39 pgs., filed under seal).

Sandra Otto, "R/3 and Oros in mySAP.com 'The Combined Solution,'" SAP AG, 2000 (23 pgs., filed under seal).

ABC Technologies, "Oros Bridge with SEM, The ABC/M Planning Solution," 2000 (26 pgs.).

* cited by examiner

| ASSIGNMENT TYPE 190-1 | OBJECT TYPE 190-2 | SUBSET 190-3 | |
|---|---|---|---|
| | | 130-1 | |
| P | ⬡ 131 | △ 132 | 191 |
| C | △ 132 | ⬡ 131 △ 132 | 192 |
| R | ⬡ 131 | □ 133 △ 132 | 193 |
| S | □ 133 | □ 133 ⬡ 131 | 194 |
| ... | ○ 134 | ... | |

FIG. 3A
190

METHOD AND COMPUTER SYSTEM FOR GRAPHICAL ASSIGNMENTS IN HIERARCHIES

FIELD OF THE INVENTION

The present invention generally relates to graphical user interfaces, and more particularly, relates to method, computer program product and system for improving the user interface for maintaining object hierarchies.

BACKGROUND OF THE INVENTION

Typically, hierarchies that help to structure assignments between objects are administrated through graphical user interfaces, such as the Microsoft Windows Explorer or the cost assignment view of ABC Technologies OROS program.

For example, in the Microsoft Windows Explorer, a folder structure is built in the form of a hierarchy. Objects of three different object types (folders, files and shortcuts) can be graphically assigned to a folder. The computer user, in the following called user, maintains the hierarchy through a) a combination of menu entries in the drop down menus of the windows explorer, b) menu entries in a context menu launched with the right mouse button and c) "drag & drop" functions launched with the left or right mouse buttons. Also shortcuts via the keyboard can be used. For example, new folders or shortcuts can be created by selecting an appropriate menu entry from the "File" menu or from the context menu; for instance, folders or files can be moved or copied by using the right mouse button for "drag & drop". Files, folders or shortcuts can be deleted by using the context menu with the right mouse button. For each object type only specific activities are allowed. For instance, a folder cannot be graphically assigned to a file or shortcut. A shortcut cannot be graphically assigned to a file but is assigned to the file in a logical relationship.

The OROS program allows the user to graphically define assignments between objects of two different hierarchies. Both hierarchies work similar to the Windows Explorer logic for adding, moving or deleting objects. Both hierarchies support three different object types: center type, account type and cost element type.

For example, a first hierarchy shows the resource view of an enterprise. A center can define a group of resources. Centers can be assigned to other centers. An account can define a specific resource, such as a machine or a building. Accounts can be assigned to centers. A cost element defines a specific type of cost, such as salary, rent etc. Cost elements can be assigned to accounts.

A second hierarchy, for example, shows the activity view of an enterprise, where centers define groups of activities, accounts define activities and cost elements, again, define specific types of cost. Similar to the first hierarchy, cost elements are assigned to accounts and accounts are assigned to centers.

When the user creates an assignment between objects of the first hierarchy and the second one, only accounts of the first hierarchy can be assigned to accounts of the second hierarchy and vice versa. The graphical user interface supports this assignment, for example, by displaying the first hierarchy (sender objects) within a first frame and only the accounts of the second hierarchy (receiver objects) as a flat object list within a second frame. When the user selects an account of the first hierarchy in the first frame, accounts in the second frame become a possible target for the assignment. This is indicated by little arrows icons next to each of the accounts in the second frame. To create the assignment the user selects one account in the second frame by clicking on the corresponding arrow icon and finally enters an assignment category and an assignment value to specify the assignment.

These examples work very well with applications that only use a limited number of object types (three in the examples above) with a limited number of possible relationships between these objects. Therefore, they provide an easy-to-use solution for graphical maintenance of hierarchical assignments in application systems that do not show a high degree of complexity as far as the number of object types and their possible dependencies are concerned. However, more complex application systems, such as Enterprise Resource Planning (ERP) systems (e.g. SAP R/3) usually support a much higher number of object types. Also the number of possible relations between the various object types is very high.

When applying the prior art user interface models to complex application systems, such as ERP systems, the user encounters some inconveniences when creating assignments within or across hierarchies. This becomes obvious, when looking at a typical organizational structure of an enterprise in an ERP system from a cost management point of view. For example, in the SAP R/3 system, a controlling area defines an area that is relevant for an enterprise from a cost management point of view. In each controlling area a hierarchy of cost center groups is defined. Multiple cost centers are assigned to a cost center group. For each cost center multiple cost elements are assigned either directly to the cost center or to activities of the cost center. Cost elements can be grouped into cost element groups. In a further hierarchy internal orders can be defined. Cost centers with cost element groups or activities can be assigned to internal orders. On the other hand internal orders can be assigned back to cost centers. The same is true for projects and project elements. Cost center activities can also be assigned to production or sales orders. For convenience of explanation, further object types and object type relations are not listed here. Numerous further object types and their possible relations to other object types within the same or across hierarchies can be taken from "CO-I Overhead Cost Controlling", published in September 1999 by SAP AG.

The user desires a clear visualization of all actual and possible dependencies between object types. For assignments across hierarchies a flat list of receiver objects, as in the prior art example, would contain a large amount of objects of different object types. This leaves the task to identify the right receiver object for an assignment completely with the user (e.g., by applying the right mouse button to every single object). To identify the receiver object is difficult because the information about the location of the receiver object within the hierarchy is hidden.

SUMMARY OF THE INVENTION

Hence, the present invention provides computer-implemented method, computer program product and computer system for improving the user interface to maintain object assignments within and across hierarchies for applications using a large number of object types with a large number of object type relations.

The present invention solves the technical problem of combining structural information in an application system with a graphical user interface that gives a user sufficient support to efficiently maintain object assignments in a complex software application environment.

According to claim 1, this is achieved by displaying a predefined object hierarchy and an object type selector on an output device to the user. The object type selector provides a plurality of predefined object types.

A rule database stores at least one predefined object type assignment of a corresponding predefined subset of object types for each object type.

A first object is inserted into the object hierarchy in accordance with one of the object type assignments. Thereby, the first object having a first object type gets graphically assigned to a second object having a second object type. Different embodiments of the interaction model between the user and the inventive computer system are described in the dependent claims.

As an advantage, the present invention visually supports the user when creating new object assignments within the object hierarchy by using indication (highlighting) techniques. This prevents the user from making mistakes, even without knowledge of object type relations allowed by the application.

A further advantage of the present invention is the ability to provide object types that result from a combination of a predefined object type with an object instance of any predefined object type, thus resulting in a multidimensional object type. This opens the present invention to also cover assignments between objects having multidimensional object types.

A further advantage lies in the visual support that the present invention provides to the user, when creating a graphical assignment from the first object of the object hierarchy to a further object of a further object hierarchy. The assignment in this case is specified by an assignment category and an assignment value. The user always knows the exact location of the objects within the corresponding object hierarchies. This location uniquely specifies each object and, therefore, is crucial for the user to avoid object assignment errors.

The visual support can even be extended to graphical assignments between objects of more than two hierarchies. This provides a technical solution for the user to create object assignment networks between objects of multiple hierarchies by using the knowledge that the inventive computer system has about allowed object type relations. Object assignment networks typically comprise a series of single-step assignments (assignments between two hierarchies) and multi-step assignments (assignments across more than two hierarchies consisting of multiple single-step assignments).

The aspects of the invention will be realized and attained by means of the elements and combinations particularly pointed out in the appended claims. It is to be understood that both, the foregoing general description and the following detailed description are exemplary and explanatory only and are not restrictive of the invention as described.

BRIEF DESCRIPTION OF THE DRAWINGS

FIG. 3A illustrates a rule database for object type assignments according to the present invention;

DETAILED DESCRIPTION OF THE INVENTION

Wherever possible, the same reference numbers will be used throughout the drawings to refer to the same or like parts. For convenience of explanation the following table lists the most important reference numbers and their descriptions.

| Reference | Description |
| --- | --- |
| 100/101 | computer program product |
| 110, 120, 120-10 | Object hierarchies |
| 110-1, 110-2, 120-1 | Subsets of object |

-continued

| Reference | Description |
| --- | --- |
| 111-119, 121-126 | Objects |
| 130 | Object type selector |
| 130-1-130-4 | Subsets of object types |
| 131-136 | Object types |
| 150, 150-1 | Assignments |
| 151, 151-1 | Assignment categories |
| 152, 151-2 | Assignment values |
| 190 | Rule database |
| 190-1 | Assignment type column |
| 190-2 | Object type column |
| 190-3 | Subset column |
| 191-194 | Object tape assignments (rows) |
| 400 | Method |
| 4xx | Method steps |
| 999 | computer network system |
| 900, 901, 902 | Computers |
| 910, 911, 912 | Processors |
| 920, 921, 922 | Memories |
| 930, 930-1, 930-2 | Bus |
| 940 | Input device |
| 950 | Output device |
| 951 | Cursor |
| 960 | User interface |
| 970 | Program carrier (computer readable device) |
| 980 | Program signal |

Reference Numbers

Figure 1:
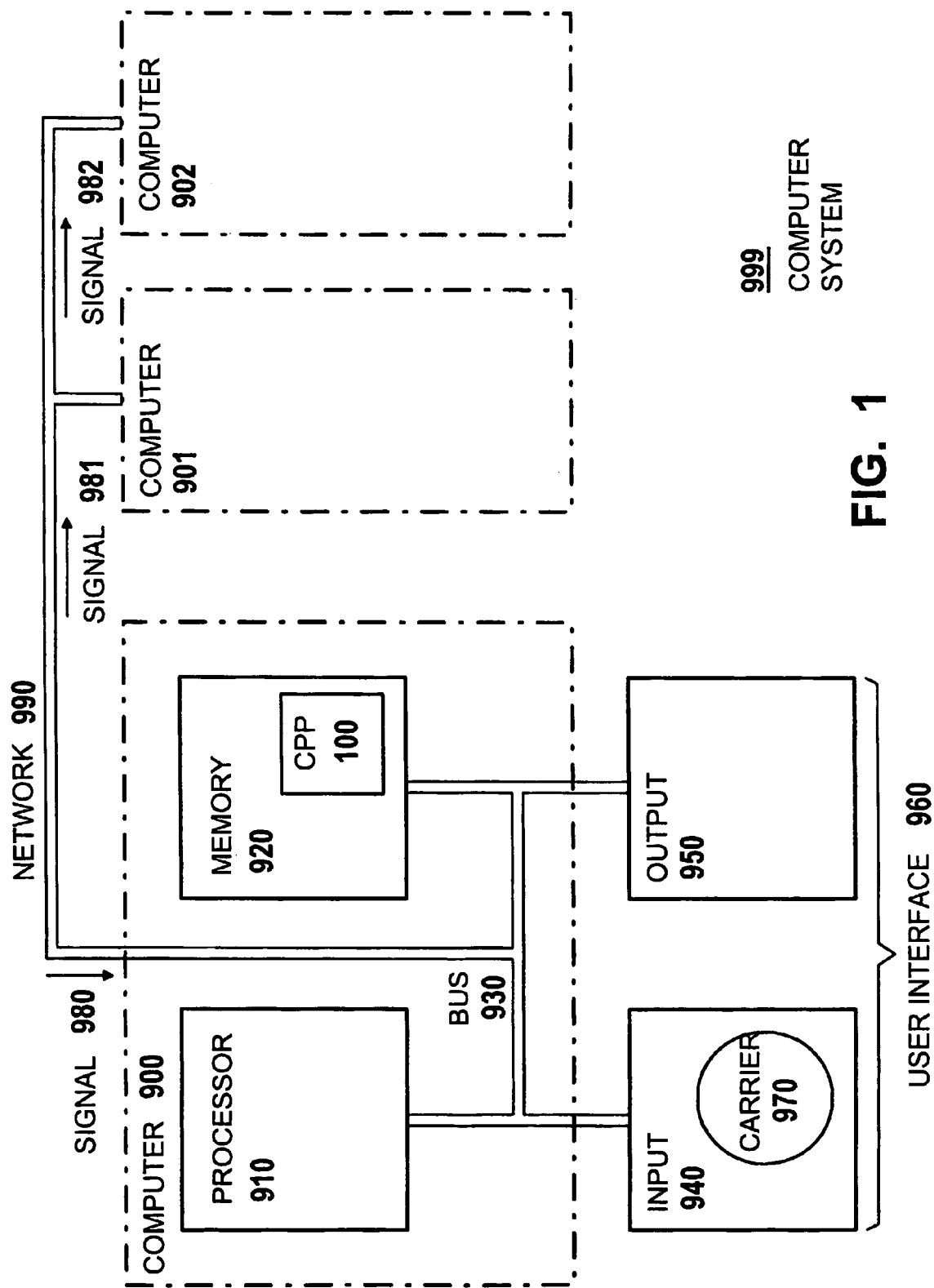
FIG. 1 illustrates a simplified block diagram of an inventive computer network system according to the present invention.

FIG. 1 illustrates a simplified block diagram of the inventive computer network system 999 having a plurality of computers 900, 901, 902 (or 90$q$, with q=0 ... Q-1, Q any number).

Computers 900-902 are coupled via inter-computer network 990. Computer 900 comprises processor 910, memory 920, bus 930, and, optionally, input device 940 and output device 950 (I/O devices, user interface 960). As illustrated, the invention is present by computer program product 100 (CPP), program carrier 970 and program signal 980, collectively "program".

In respect to computer 900, computer 901/902 is sometimes referred to as "remote computer", computer 901/902 is, for example, a server, a router, a peer device or other common network node, and typically comprises many or all of the elements described relative to computer 900. Hence, elements 100 and 910-980 in computer 900 collectively illustrate also corresponding elements 10$q$ and 91$q$-98$q$ (shown for q=0) in computers 90$q$.

Computer 900 is, for example, a conventional personal computer (PC), a desktop and hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, such as, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick, or by any other media, like paper.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained with more detail below. In other words, CPP 100 defines the operation of computer 900 and its interaction in network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner. Although the examples are devices with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or a display, (cathode ray tube (CRT), flat panel display, liquid crystal display (LCD), speaker, printer, plotter, vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930", connections between computers 900-902 are referred to as "network 990". Optionally, network 990 comprises gateways being computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the internet (i.e. world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Transmission protocols and data formats are known, for example, as transmission control protocol/internet protocol (TCP/IP), hyper text transfer protocol (HTTP), secure HTTP, wireless application protocol, unique resource locator (URL), a unique resource identifier (URI), hyper text markup language HTML, extensible markup language (XML), extensible hyper text markup language (XHTML), wireless application markup language (WML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

Figure 2:
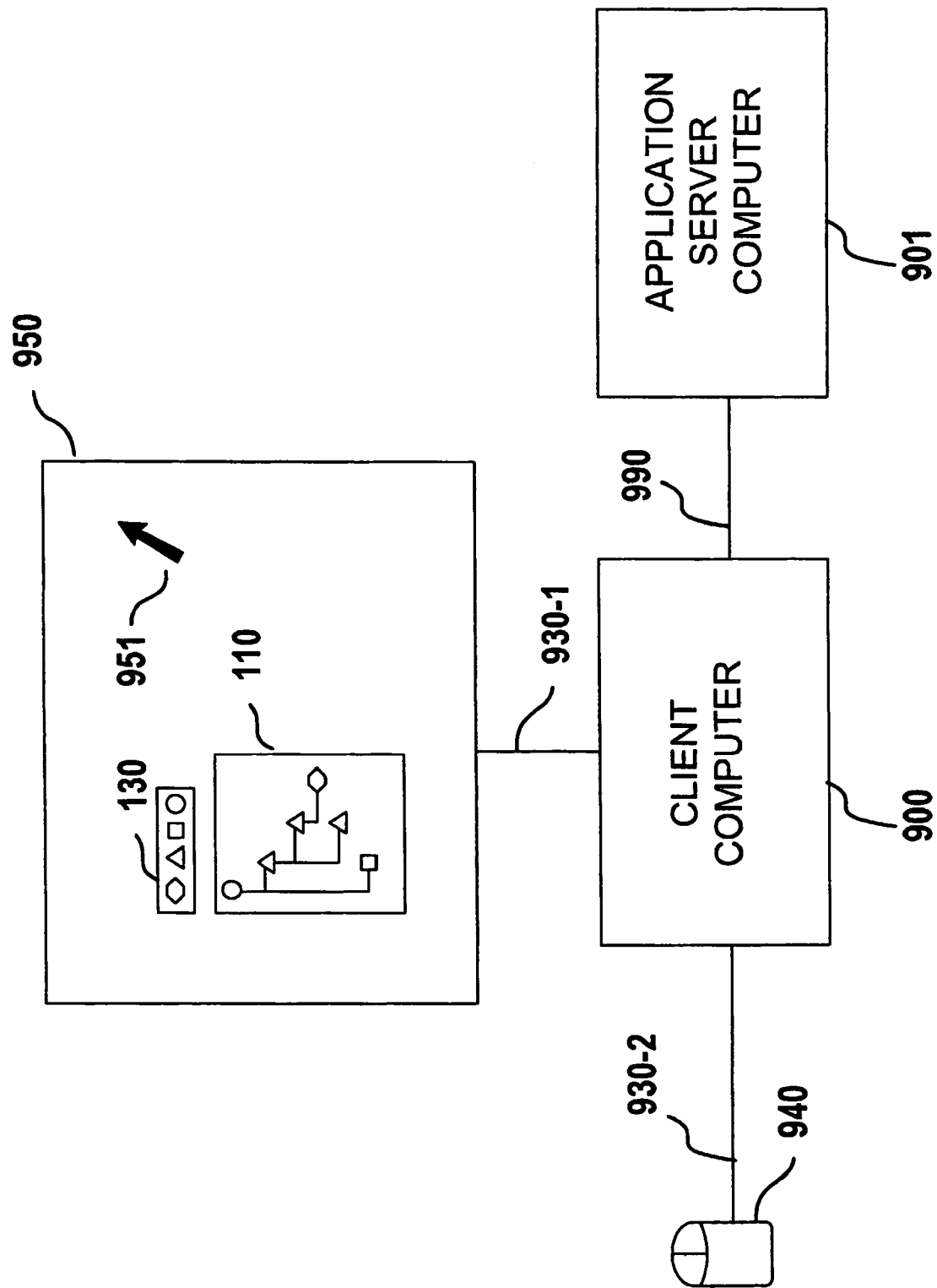
FIG. 2 illustrates a simplified view of a specific embodiment of the inventive computer network system.

FIG. 2 illustrates a simplified view of a specific embodiment of inventive computer network system 999.

Without the intention to restrict the use of computer 900, preferably, computer 900 serves as client computer 900 for a user (not shown) to access application server computer 901 through network 990. Preferably, application computer 901 provides application data, such as predefined object hierarchy 110 and object type selector 130 to client computer 900. The application data are processed by using a user interface that comprises input device 940 (e.g. mouse device) and output device 950 (e.g. monitor). Input device 940 and output device 950 are connected to client computer 900 via bus branches 930-2 and 930-1, respectively. Output device 950 visualizes object hierarchy 110 and object type selector 130. Preferably, input device 940 controls cursor 951 on output device 950 via client computer 900. When cursor 951 on output device 950 is moved to specific elements of object type selector 130 or object hierarchy 110 (explained in detail under FIG. 4), the user can initiate changes of the application data by, for example, using buttons of input device 940 to perform "drag & drop" like operations or select specific activities from a context menu (not shown).

FIG. 3A illustrates rule database 190 for object type assignments 191-194 according to the present invention. Rule database 190 contains predefined rules (object type assignments 191-194) describing relationships between various object types 131-134 of an application. An example of a relationship between objects within a hierarchy is a parent-child (P,C) relationship, wherein a child object is subordinate to a parent object. A further example of a relationship between objects across hierarchies is a sender-receiver (S,R) relationship, wherein a sender object is submitting data to a receiver object. For convenience of explanation, FIGS. 2-9 symbolize object types 131-134 by diamonds, triangles, squares and circles, respectively.

Preferably, rule database 190 is stored on application server computer 901 (cf. FIG. 2) but can also be stored on any storage device that is connected to computer network system 999 (cf. FIG. 1). Preferably, rule database 190 is implemented as a table comprising at least three columns 190-1 to 190-3. The first column 190-1 corresponds to an assignment type (P, C, R, S) characterizing the object type assignment, the second column 190-2 corresponds to an object type (131-134) and the third column 190-3 corresponds to a subset (130-1 to 130-4) of N object types that is assigned to the object type (131-134) in the second column 190-2. Each object type assignment 191-194 corresponds to a row in rule database 190.

For example, assignment 191 indicates that subset 130-1 includes object type 132, which is assigned to object type 131 as parent (P) object type. In other words, within a hierarchy, objects having the object type 131 can only have parent objects that have object type 132. Assignment 192 indicates that subset 130-2 includes object types 131, 132, which are assigned to object type 132 as child (C) object types.

Assignment 193 indicates that subset 130-3 includes object types 132, 133, which are assigned to object type 131 as receiver (R) object types. In other words, an object having object type 131 can submit data only to object types 132, 133. Assignment 194 indicates that subset 130-4 includes object types 131, 133, which are assigned to object type 133 as sender (S) object types. In other words, an object having object type 133 can receive data only from object types 131, 133.

The advantage of such a rule database 190 is that any complex relationship between object types, whether within or across object hierarchies, is reflected by one or more linear object type assignments for each object type, preferably, in one rule database 190.

Figure 3B:
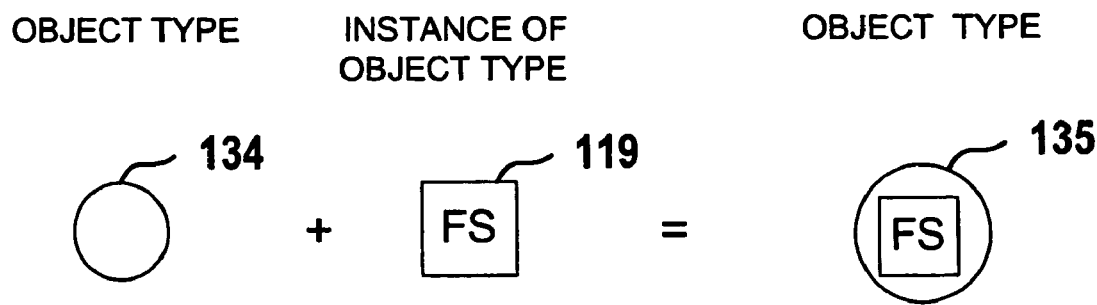
FIG. 3B illustrates the definition of a multidimensional object type.

FIG. 3B illustrates the definition of a multidimensional predefined object type 135. For example, further predefined object type 135 results from a combination of predefined object type 134 with an object instance 119 of predefined object type 133. In other words, object 119 is the object FIRST SQUARE (FS), which is an instance of object type 133 (square, cf. FIG. 3A). Object type 134 (circle) is combined with object 119 (FS) to define further predefined object type 135 (circles for FS). For convenience of explanation, object 119 is a specific "controlling area" (CA) within an enterprise; object type 134 is "cost center". In this case further object type 135 becomes the multidimensional object type "cost center in controlling area CA".

The advantage of this mechanism is that rule database 190 becomes automatically applicable to multidimensional object types, such as object type 135.

Figure 3C:
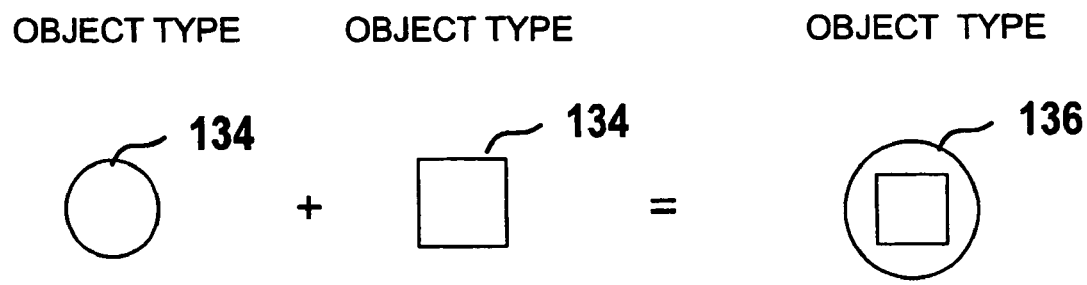
FIG. 3C illustrates the definition of a further multidimensional object type.

FIG. 3C illustrates the definition of a further multidimensional predefined object type 136. For example, further multidimensional object type 136 results from a combination of two predefined object types 133, 134. In other words, object type 134 (circle) is combined with object type 133 (square) to define further multidimensional object type 136 (circles for squares). For convenience of explanation, object type 133 refers to a "controlling area" type within an enterprise; object type 134 refers to a "cost center" type. In this case further object type 136 becomes the multidimensional object type "cost center in controlling area".

Figure 4:
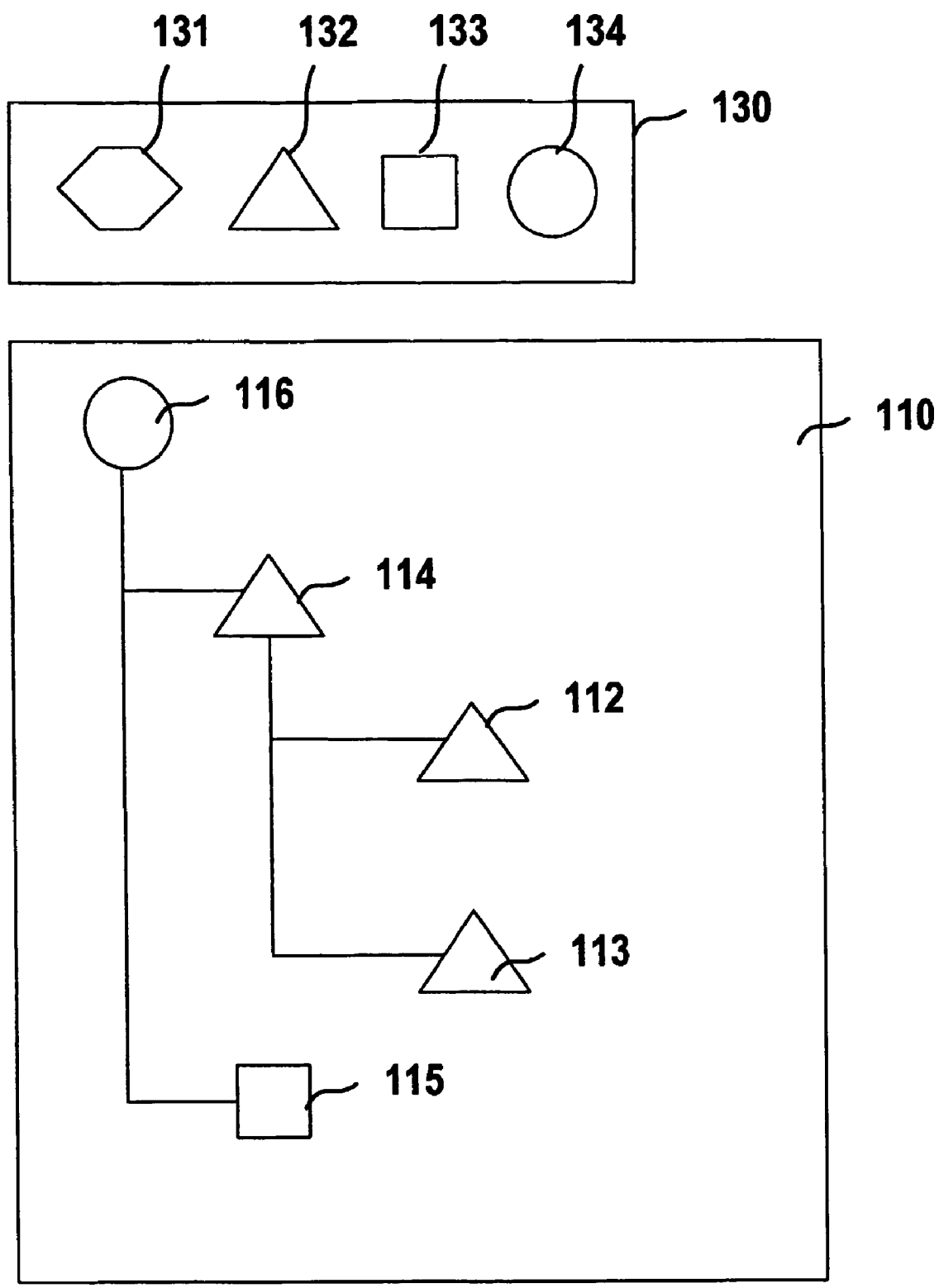
FIG. 4 illustrates the initial state of an object hierarchy and an object type selector when inserting an object according to the present invention.

FIG. 4 illustrates the initial state of object hierarchy 110 and object type selector 130 when inserting object 111 (cf. FIG. 5B) according to the present invention. Predefined object hierarchy 110 and object type selector 130 are displayed 410 (cf. FIG. 11) on output device 950 (cf. FIG. 2).

Object type selector 130 provides a plurality of predefined object types 131-134. If the number of object types is too big to simultaneously display all object types 131-134 in object type selector 130, a person of skill in the art can implement a "scrolling" function or the like within object type selector 130. The "scrolling" function allows the user to scroll the plurality of object types and, therefore, make available each object type through object type selector 130.

Object hierarchy 110 comprises a plurality of objects 112-116. As used hereinafter, lines between the objects (e.g., 112-116) indicate parent-child relationships. Parent objects (e.g. 114) are shown left to their child objects (e.g. 112). In case that not all of the objects 112-116 can be displayed simultaneously on output device 950, a person of skill in the art can implement a "scrolling" function for object hierarchy 110 that allows a user to scroll the object hierarchy and, therefore, make available each object on output device 950.

In FIGS. 4-6 Elements that are highlighted are shown with solid lines. Elements that are not highlighted are shown with dashed lines. Highlighting, as used hereinafter, can be achieved, for example, by using colour or pattern effects for highlighted objects, providing selection lists with the highlighted objects or simply by sending a message to the user that provides information about the highlighted objects.

In the following, first object 111 (cf. FIG. 5B) is inserted 430 (cf. FIG. 11) into object hierarchy 110 in accordance with one of the object type assignments 191, 192, depending on the embodiment of the present invention. First object ill has first object type 131 and gets assigned to second object 112 having second object type 132.

Figure 5B:
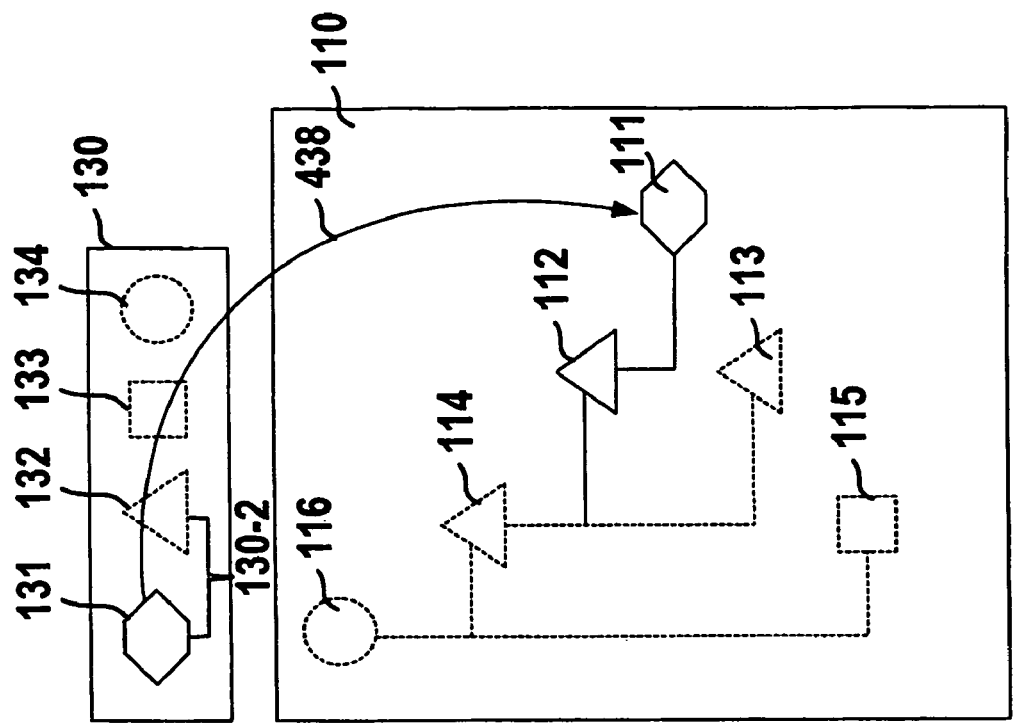
FIG. 5B illustrates the final state of the object hierarchy and the object type selector when inserting an object in the first preferred embodiment of the present invention.
Figure 5A:
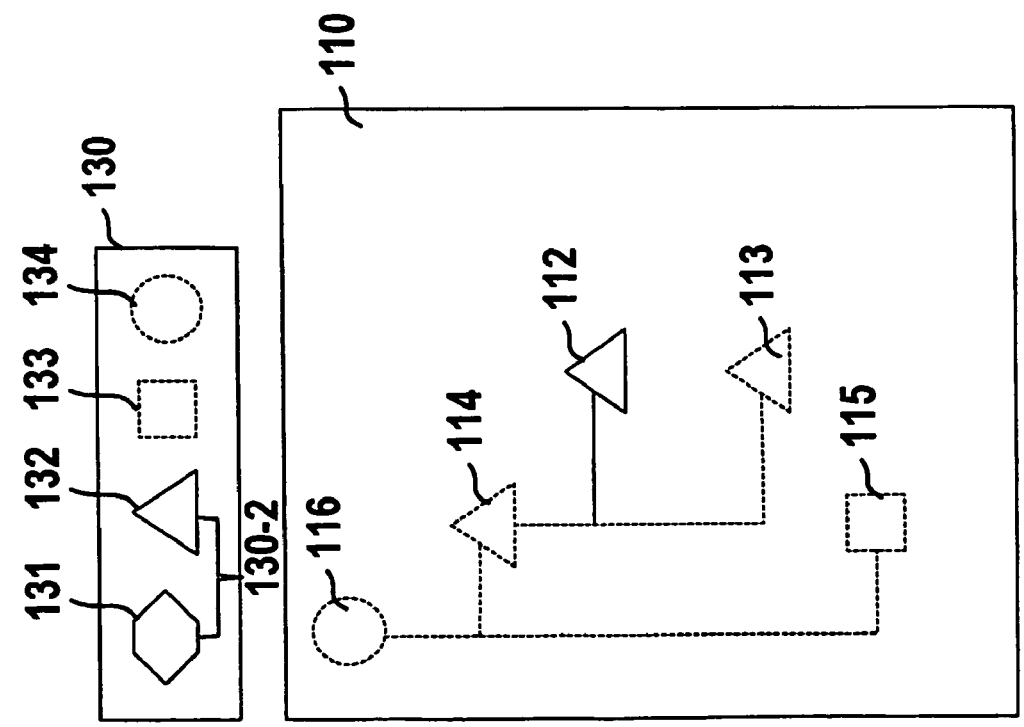
FIG. 5A illustrates an intermediate state of the object hierarchy and the object type selector when inserting an object in a first preferred embodiment of the present invention.

FIG. 5A illustrates in a first preferred embodiment of the present invention an intermediate state of object hierarchy 110 and object type selector 130 when inserting object 111. Object 111 is to be added to object hierarchy 110 with object 112 as parent node.

Preferably, the user selects 435 (cf. FIG. 12B) second object 112 as parent node for first object 131 (e.g. by clicking on the object with cursor 951 and mouse 940). Object 112 has object type 132. Object type assignment 192 (cf. FIG. 3A) in rule database 190 assigns subset 130-2 of object types to object type 132. Subset 130-2 comprises child object types 131, 132 (C) of object type 132.

Client computer 900 (cf. FIG. 2) indicates 436 (cf. FIG. 12B) second subset 130-2 of object types in object type selector 130 on output device 950. Preferably, this is achieved by highlighting object types 131, 132 of subset 130-2 in object type selector 130. Preferably, selected second object 112 is also highlighted.

FIG. 5B illustrates the final state of object hierarchy 110 and object type selector 130 when inserting first object 111 into object hierarchy 110 in the first preferred embodiment of the present invention.

Preferably, the user selects 437 (cf. FIG. 12B) first object type 131 from subset 130-2 in object type selector 130 as the object type of object 111 (e.g. by clicking on object type 131).

Computer system 999 adds 438 first object 111 as child of second object 112 to object hierarchy 110 and visualizes the result for the user on output device 950. First object 111 is instantiated as an instance of selected first object type 131. It is not important for the invention, where object hierarchy 110 is stored. Preferably object hierarchy 110 is stored on server computer 901 (cf. FIG. 2).

Figure 6B:
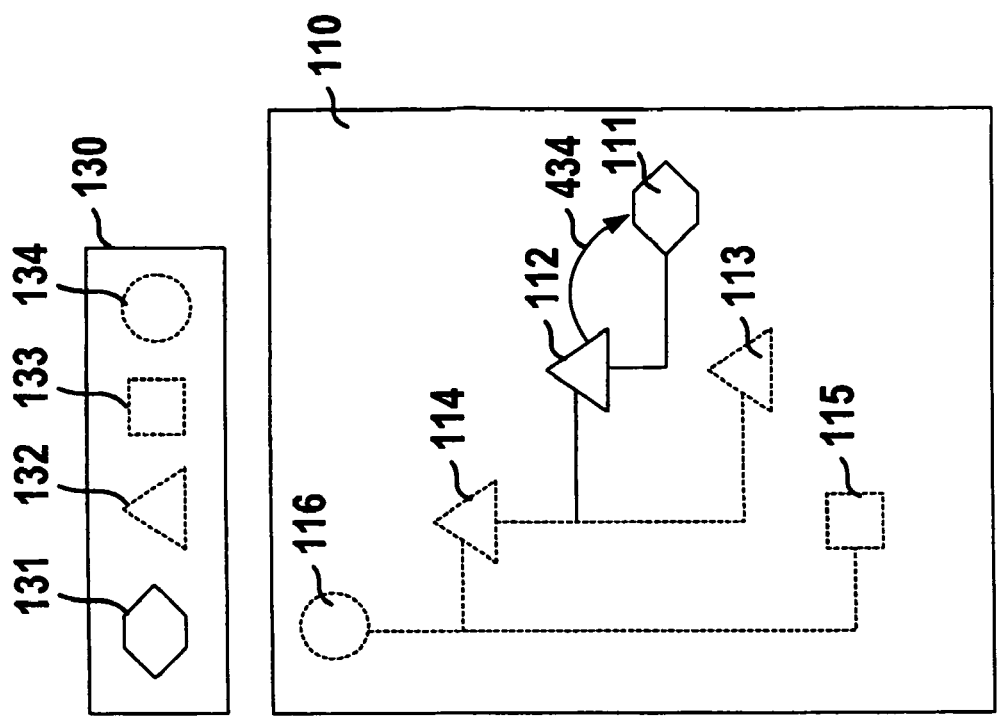
FIG. 6B illustrates the final state of the object hierarchy and the object type selector when inserting an object in the second preferred embodiment of the present invention.
Figure 6A:
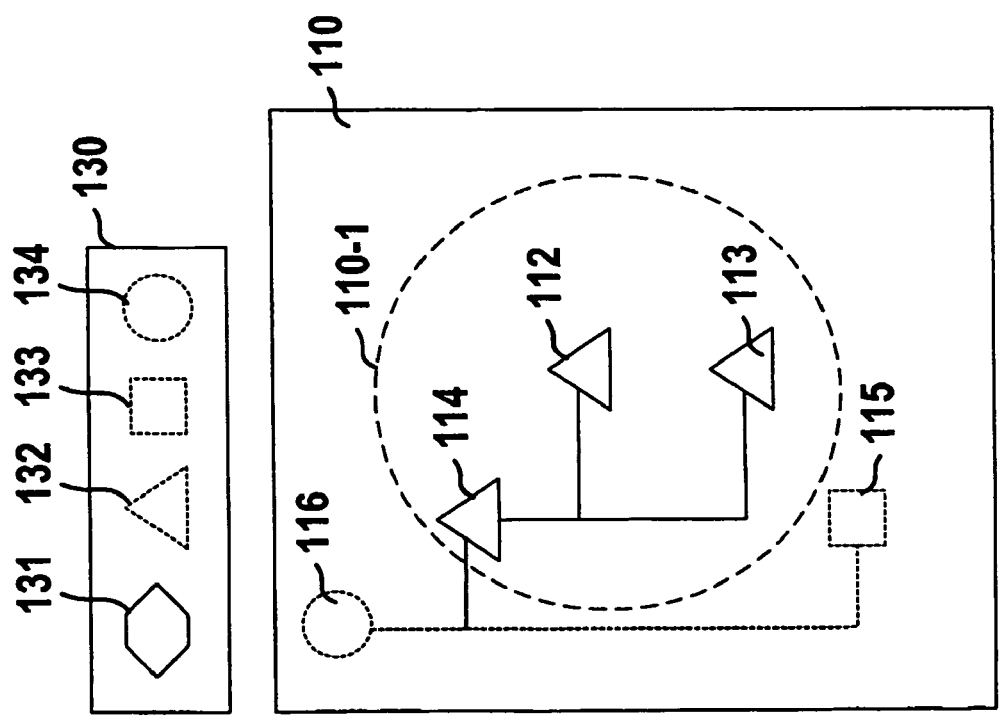
FIG. 6A illustrates an intermediate state of the object hierarchy and the object type selector when inserting an object in a second preferred embodiment of the present invention.

FIG. 6A illustrates in a second preferred embodiment of the present invention an intermediate state of object hierarchy 110 and object type selector 130 when inserting object 111. Object 111 is to be added to object hierarchy 110 with object 112 as parent node.

Starting again with the initial state of object hierarchy 110 that is described under FIG. 4, preferably, the user selects 431 (cf. FIG. 12A) first object type 131 from the plurality of object types 131-134 in object type selector 130 as the object type of object 111. Object type assignment 191 (cf. FIG. 3A) in rule database 190 assigns subset 130-1 of object types to object type 131. Subset 130-1 comprises parent object types 132 (P) of object type 131.

Client computer 900 (cf. FIG. 2) indicates 432 (cf. FIG. 12B) subset 110-1 of objects in the object hierarchy 110 on output device 950 (e.g. by highlighting objects 112-114). Subset 110-1 comprises objects 112-114 having an object type which is included in first subset 130-1 of object types. Preferably, selected first object type 131 is also highlighted in object type selector 130.

FIG. 6B illustrates the final state of object hierarchy 110 and object type selector 130 when inserting first object 111 into object hierarchy 110 in the second preferred embodiment of the present invention.

Preferably, the user selects 434 second object 112 from subset 110-1 of objects as a parent node for first object 111 (e.g. by clicking on second object 112).

Computer system 999 adds 435 (cf. FIG. 12A) first object 111 as child of second object 112 to object hierarchy 110 and visualizes the result for the user on output device 950. First object 111 is instantiated as an instance of selected first object type 131. It is not important for the invention, where object hierarchy 110 is stored. Preferably object hierarchy 110 is stored on server computer 901 (cf. FIG. 2).

The advantage of the computer-implemented method to maintain object assignments within an object hierarchy, as described under FIGS. 2-6, is the improvement of the user's interaction with client computer 900 when compared to the prior art. The visualization of predefined relations between different object types facilitates the task of the user to insert the right object at the right place within the object hierarchy. This becomes essential especially when application data use a large number of object types with a large number of possible relations amongst these object types (typically in complex applications, such as ERP or Customer Relationship Management systems). The user, therefore, gains better control of the computer system and is less prone to make mistakes when causing the computer system to process application data that show a hierarchical structure. The computer system 999 assists the user with rule database 190 to assign any object within a hierarchy in accordance with predefined object type assignment rules (e.g. 191-194), thus eventually resulting in multidimensional object types (cf. FIG. 3B).

The idea of facilitating the maintenance of assignments within a hierarchy can be extended to assignments between objects across hierarchies. Without the intention of limiting the scope of the present invention, FIGS. 7-9 illustrate further embodiments of the present invention, where object assignments are defined between multiple hierarchies.

In case of having more than two hierarchies and more than one assignment between objects of the hierarchies, "multilevel assignments" can be defined by using the present invention.

Figure 7:
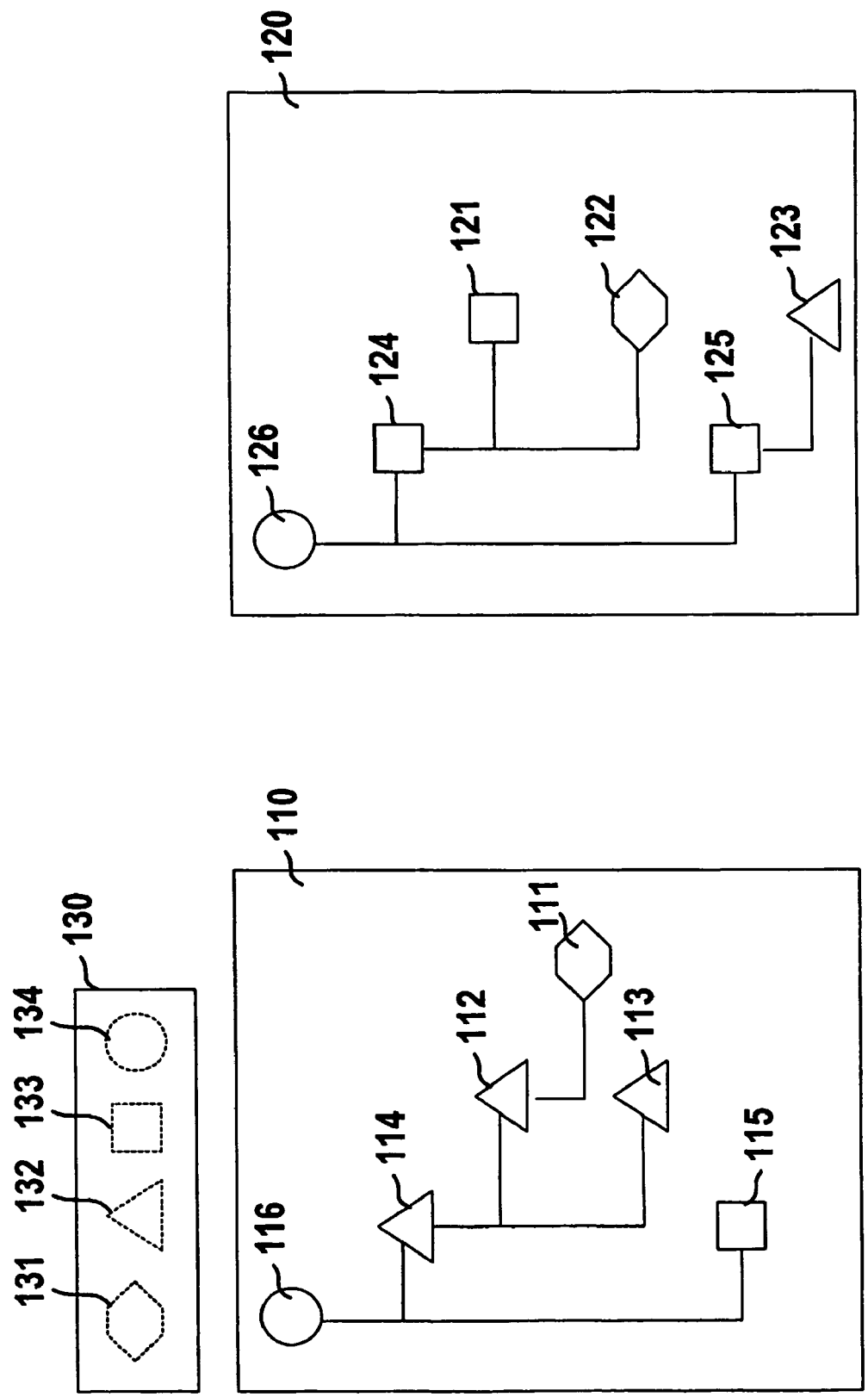
FIG. 7 illustrates the initial state of two object hierarchies when creating an assignment between objects belonging to different hierarchies according to the present invention.

FIG. 7 illustrates the initial state of two object hierarchies 110, 120 when creating an assignment 150 (cf. FIG. 8B) between objects 111, 121 belonging to different object hierarchies 110, 120, respectively, according to the present invention.

As used hereinafter, the term "similar" is used to indicate that two objects or means are equivalent from a functional point of view but can comprise different data. Further predefined object hierarchy 120 is displayed 440 (cf. FIG. 13) on output device 950 next to object hierarchy 110. Further object hierarchy 120 is similar to the object hierarchy 110. Further object hierarchy 120 combined with object type selector 130 support equivalent functions as object hierarchy 110 combined with object type connector 130. Alternatively, object hierarchy 120 can be combined with a further object type selector (not shown). Further object hierarchy 120 comprises a plurality of objects 121-126. Third object 121 has third object type 133.

In the following (FIGS. 8-9), graphical assignment 150 is created 450 (cf. FIG. 13) from first object 111 to third object 121 in accordance with one of the object type assignments 193, 194, depending on the embodiment of the invention. Graphical assignment 150 is specified by assignment category 151 and assignment value 152.

Figure 8A:
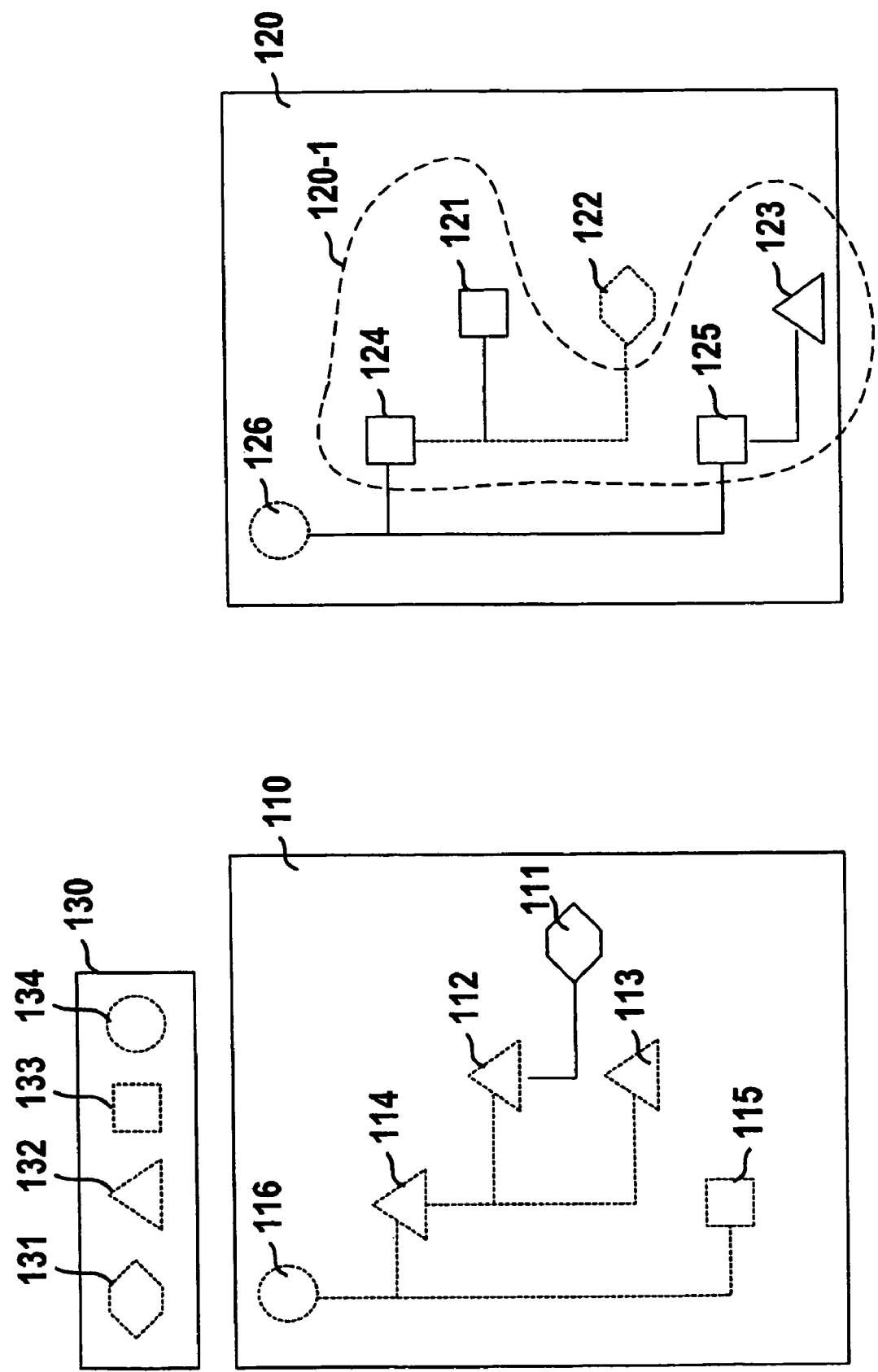
FIG. 8A illustrates in a third preferred embodiment of the present invention an intermediate state of the two object hierarchies when creating the assignment between objects of both object hierarchies.

FIG. 8A illustrates in a third preferred embodiment of the present invention an intermediate state of the two object hierarchies 110, 120 when creating assignment 150 (cf. FIG. 8B) between objects 111, 121 of object hierarchies 110, 120, respectively. Object type assignment 193 (cf. FIG. 3A) in rule database 190 assigns subset 130-3 of object types to first object type 131. Subset 130-3 comprises receiver object types 132, 133 (R) of object type 131.

For example, the user selects 451 (cf. FIG. 14A) first object 111 as sender object of graphical assignment 150 (e.g. by clicking on first object 111).

Client computer 900 (cf. FIG. 2) indicates 452 (cf. FIG. 14A) receiver subset 120-1 of objects in the further object hierarchy 120. Receiver subset 120-1 of objects 121, 123, 124, 125 comprises objects having receiver object types 132, 133, which are included in third subset 130-3 of object types. Preferably, indicating 452 is achieved by highlighting objects 121, 123, 124, 125 or by displaying an assignment icon (not shown) next to each object of subset 120-1.

Figure 8B:
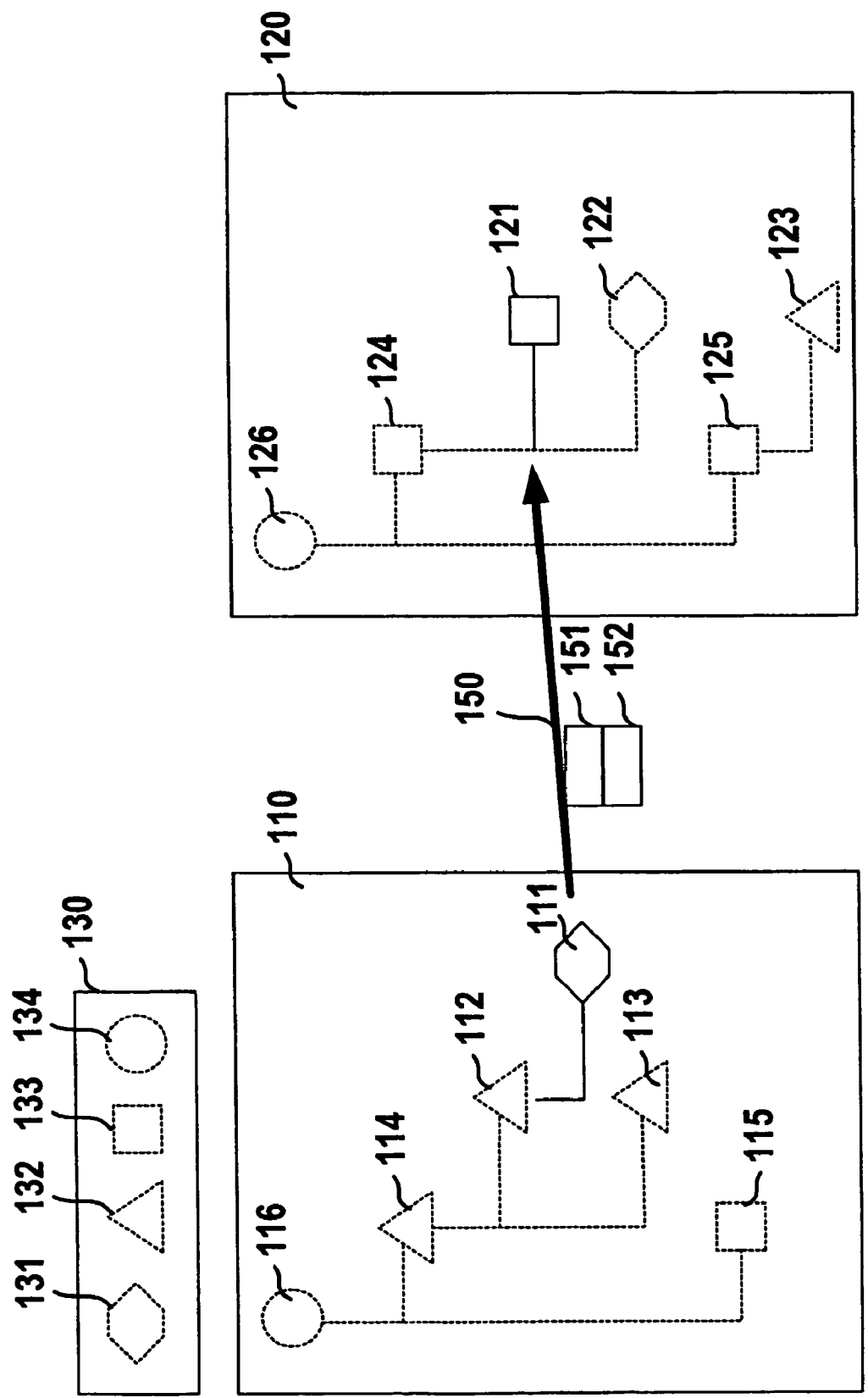
FIG. 8B illustrates in the third preferred embodiment of the present invention the final state of the two object hierarchies when creating the assignment between objects of both object hierarchies.

FIG. 8B illustrates in the third preferred embodiment of the present invention the final state of the two object hierarchies 110, 120 when creating assignment 150 between objects 111, 121 of both object hierarchies 110, 120.

For example, the user selects 453 (cf. FIG. 11A) third object 121 from receiver subset 120-1 of objects as receiver object of graphical assignment 150 (e.g. by clicking on third object 121).

Computer system 999 creates 454 (cf. FIG. 14A) graphical assignment 150 from first object 111 to third object 121 and, preferably, visualizes the result for the user on output device 950. For example, assignment 150 is displayed as an arrow pointing from first object 111 to third object 121.

Computer system 999 receives 455 (cf. FIG. 14A) assignment category 151 and assignment value 152 to specify assignment 150. For example the user enters assignment category 151 and assignment value 152 via input device 940 or an application program (not shown) of computer system 999 automatically provides the information. For example, if assignment category 152 is "percentage" then assignment value 152 contains a percentage value, such as 20%. Object type 131 of first object ill determines the base for the percentages, such as hours, US dollars, etc.

Figure 9A:
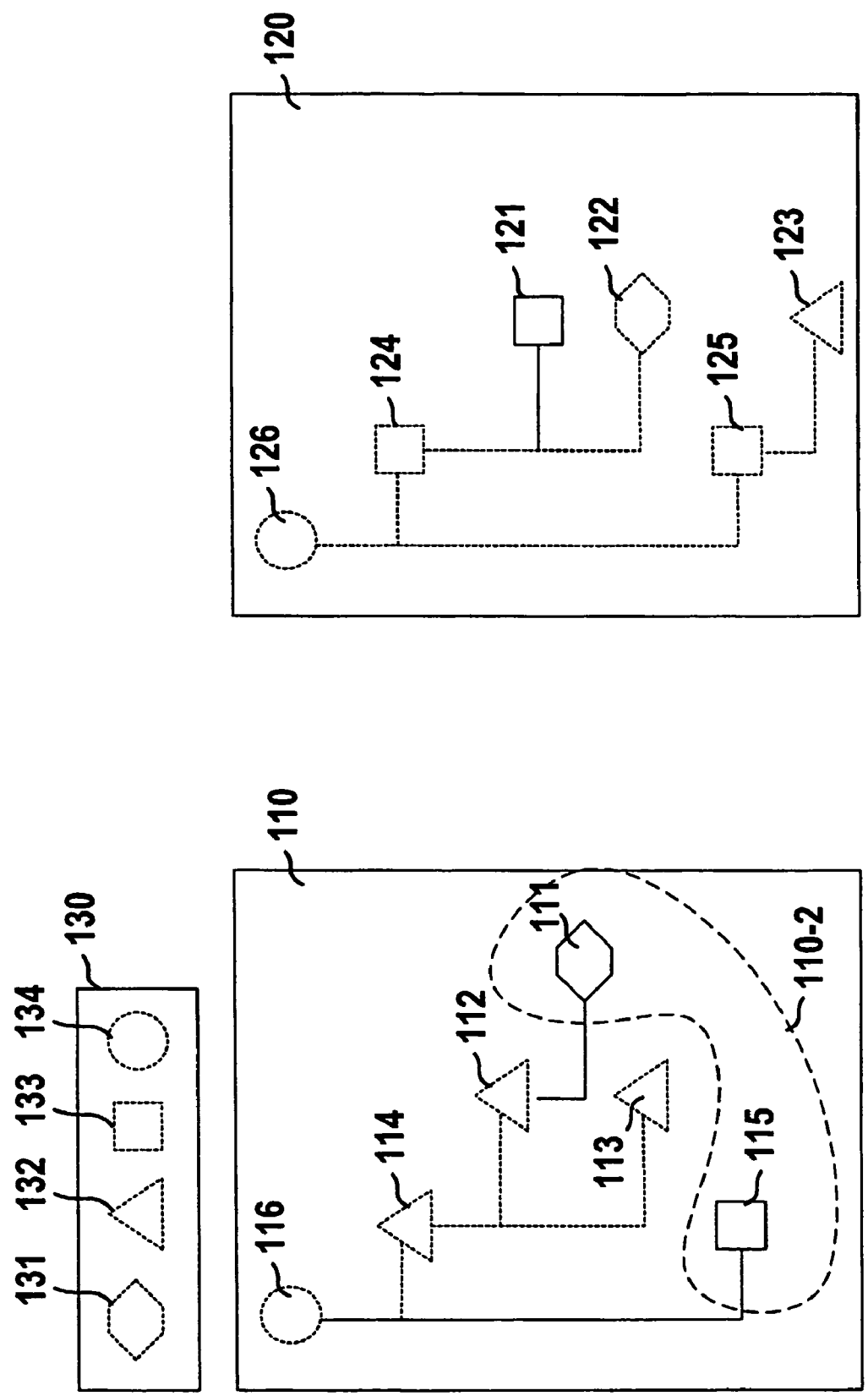
FIG. 9A illustrates in a forth preferred embodiment of the present invention an intermediate state of the two object hierarchies when creating the assignment between objects of both object hierarchies.

FIG. 9A illustrates in a forth preferred embodiment of the present invention an intermediate state of the two object hierarchies 110, 120 when creating assignment 150 (cf. FIG. 8B) between objects 111, 121 of object hierarchies 110, 120, respectively. Object type assignment 194 (cf. FIG. 3A) in rule database 190 assigns subset 130-4 of object types to third object type 133. Subset 130-4 comprises sender object types 131, 133 (S) of object type 133.

For example, the user selects 456 (cf. FIG. 14B) third object 121 as receiver object of graphical assignment 150 (e.g. by clicking on third object 121).

Client computer 900 (cf. FIG. 2) indicates 457 (cf. FIG. 14B) sender subset 110-2 of objects in object hierarchy 110. Sender subset 110-2 of objects comprises objects 111, 115 having sender object types 131, 133, respectively, which are included in forth subset 130-4 of object types. Preferably, indicating 457 is achieved by highlighting objects 111, 115 or by displaying an assignment icon (not shown) next to each object of subset 110-2.

Figure 9B:
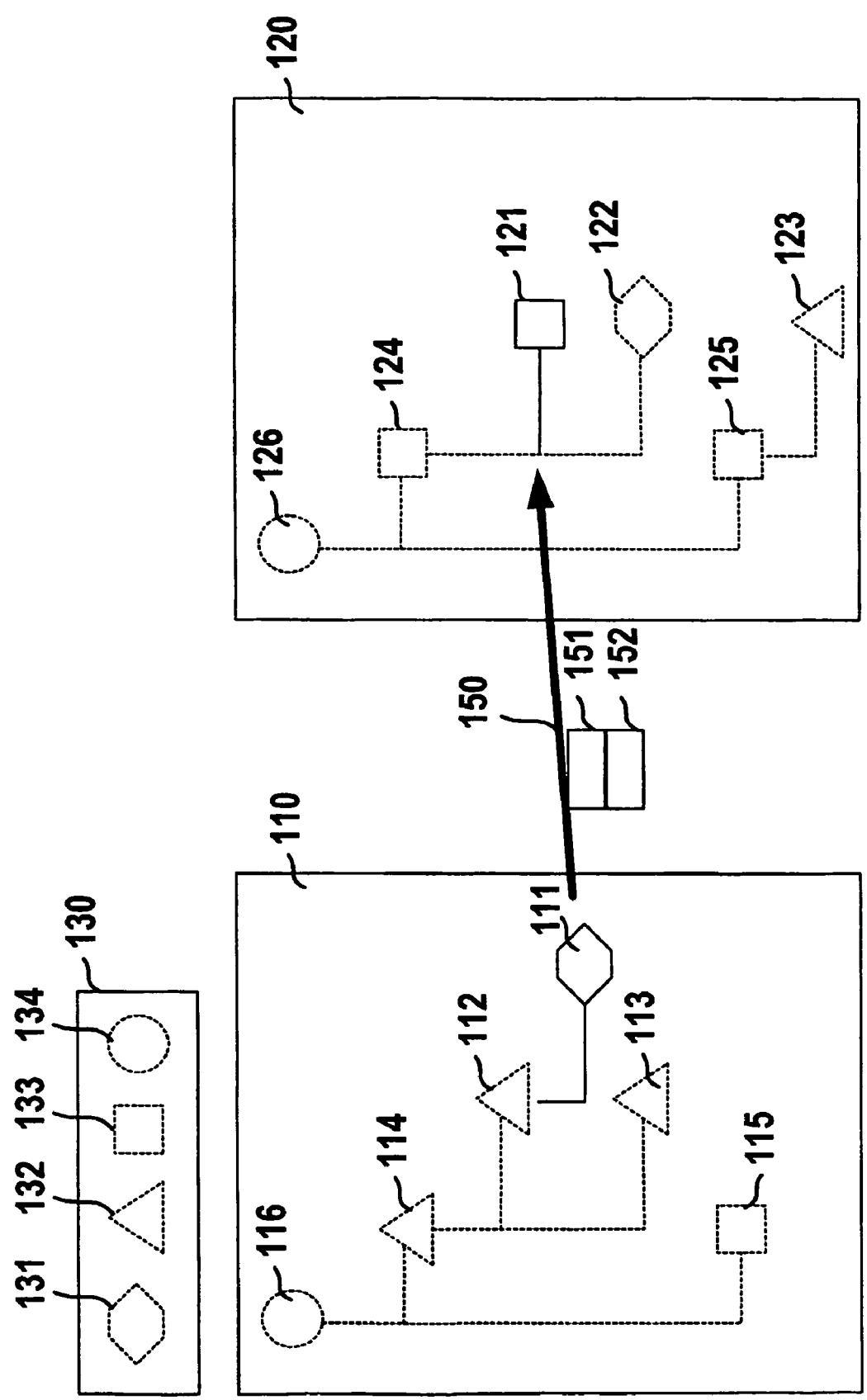
FIG. 9B illustrates in the forth preferred embodiment of the present invention the final state of the two object hierarchies when creating the assignment between objects of both object hierarchies.

FIG. 9B illustrates in the forth preferred embodiment of the present invention the final state of the two object hierarchies 110, 120 when creating assignment 150 between objects 111, 121 of both object hierarchies 110, 120.

For example, the user selects 458 (cf. FIG. 11B) first object 111 from sender subset 110-2 of objects as sender object of graphical assignment 150 (e.g. by clicking on first object 111).

Computer system 999 creates 459 (cf. FIG. 14B) graphical assignment 150 from first object 111 to third object 121 and, preferably, visualizes the result for the user on output device 950. For example, assignment 150 is displayed as an arrow pointing from first object 111 to third object 121. It is not important for the invention, where assignment 150 is stored. Preferably, assignment 150 is stored on server computer 901 (cf. FIG. 2).

Computer system 999 receives 460 (cf. FIG. 14A) assignment category 151 and assignment value 152 to specify assignment 150. For example the user enters assignment category 151 and assignment value 152 via input device 940 or an application program (not shown) of computer system 999 automatically provides the information.

The advantage of the present invention over prior art systems is that the user gets better control of the system when creating graphical assignments between objects that are part of different object hierarchies and have complex object type relations. The user can always see the exact location of each object in an hierarchy. Further, the user is assisted by computer system 999 in identifying the right sender or receiver objects because computer system 999 visualizes objects having object types in accordance with rule database 190. This prevents the user from creating wrong assignments that are meaningless from an application context point of view.

Figure 10:
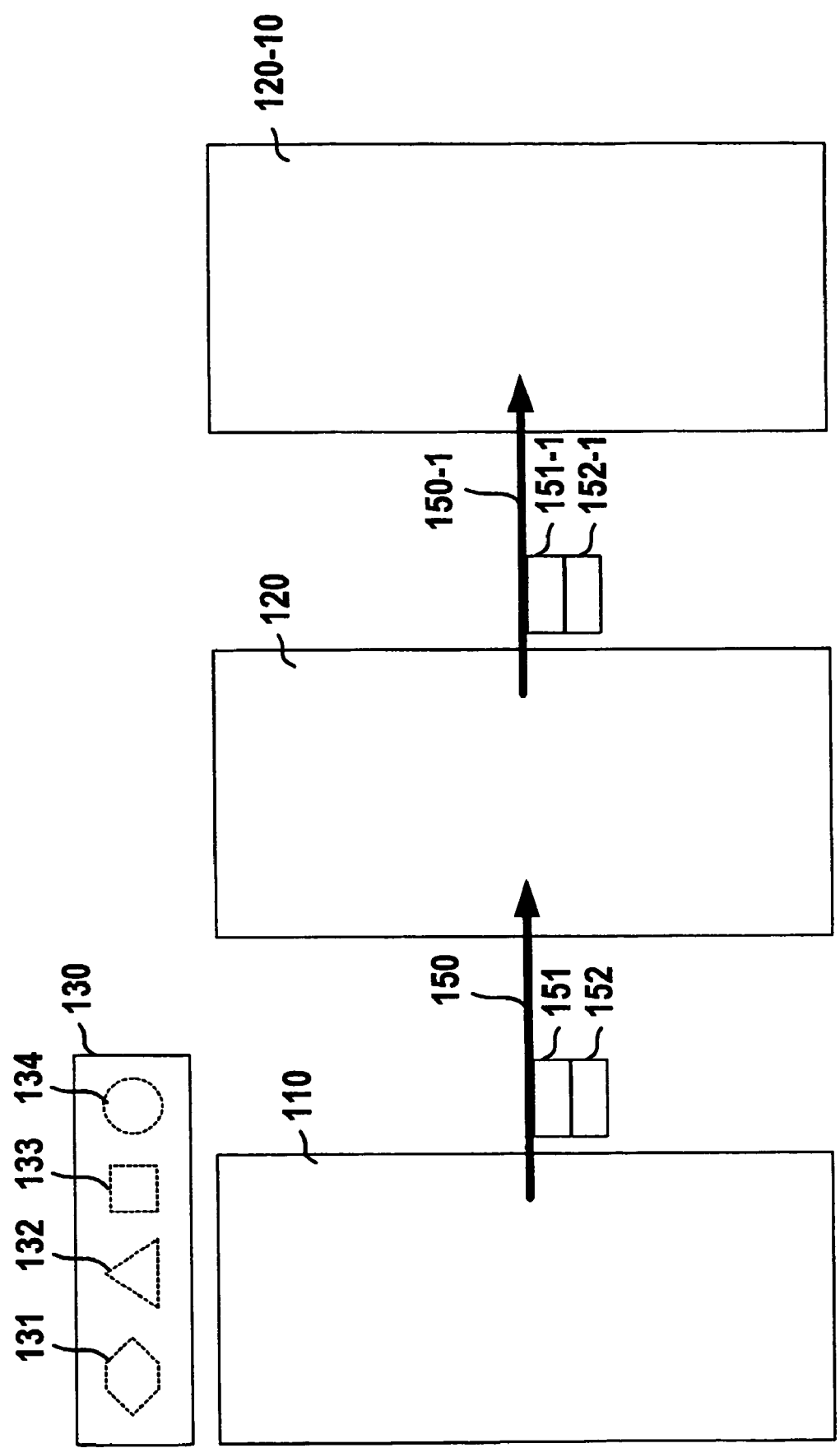
FIG. 10 illustrates in a fifth preferred embodiment of the present invention the final state of three object hierarchies when creating two assignments between objects of the three object hierarchies.

Moreover, the previously described method for creating assignments between two object hierarchies can still be extended to more that two hierarchies, thus giving support for multilevel-assignments between objects of at least three hierarchies (details under FIG. 10). This facilitates the task for the user when creating complex assignment networks between objects of multiple object hierarchies.

FIG. 10 illustrates in a fifth preferred embodiment of the present invention the final state of three object hierarchies 110, 120, 120-10, when creating two assignments 150, 150-1 between objects of the three object hierarchies 110, 120, 120-10. In case a receiver object of assignment 150 in object hierarchy 120 is simultaneously a sender object of assignment 150-1, assignments 150 and 150-1 can be considered as a two-level assignment from an object of object hierarchy 110 to an object of hierarchy 120-10.

Preferably, still further predefined object hierarchy 120-10 that is similar to object hierarchy 110 is displayed 470 (cf. FIG. 15) next to object hierarchies 110 and 120 on display device 950.

Similar to the procedures described under FIGS. 7-9, further graphical assignment 150-1 is created 480 (cf. FIG. 15) from an object of one of the other object hierarchies 120 to an object of still further object hierarchy 120-10 in accordance with one of the object type assignments of rule database 190. Further graphical assignment 150-1 is specified by further assignment category 151-1 and further assignment value 152-1.

Having described various embodiments of the present invention in detail, the following figures now summarize method 400 of the present invention and its variants.

Figure 11:
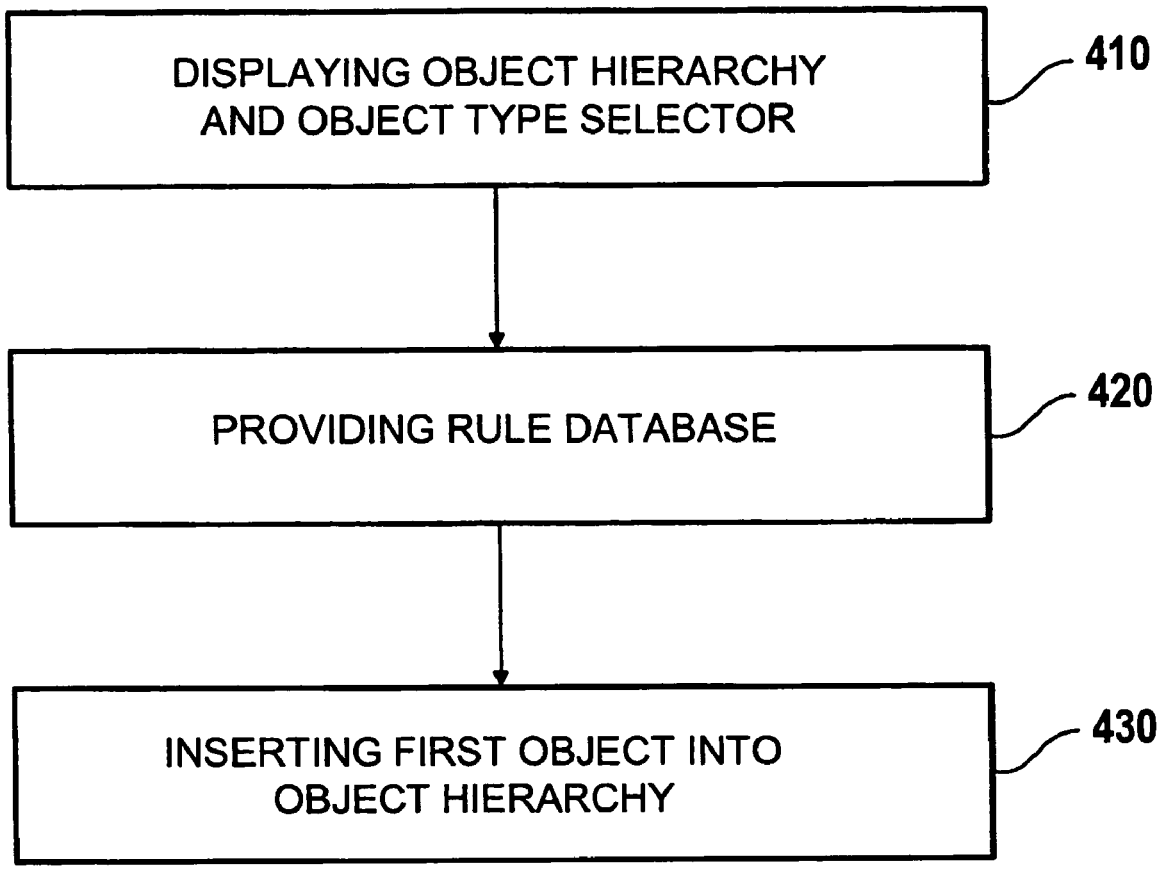
FIG. 11 illustrates a method for creating an object assignment within an object hierarchy.

FIG. 11 illustrates method 400 for creating an object assignment within object hierarchy 110. Method 400 comprises steps displaying 410, providing 420 and inserting 430.

In the displaying 410 step predefined object hierarchy 110 and object type selector 130 are displayed on output device 950. Object type selector 130 provides a plurality of predefined object types 131-134 to the user.

In the providing 420 step computer system 999 provides rule database 190. Rule database 190 stores for each object type 131-134 at least one predefined object type assignment (e.g., 191-194) of a corresponding predefined subset (e.g., 130-1, 130-2, 130-3, 130-4) of object types to the object type.

In the inserting 430 step first object 111 is inserted into object hierarchy 110 in accordance with one of the object type assignments (e.g. 191, 192), wherein first object 111 has first object type 131 and gets assigned to second object 112 having second object type 132.

Figure 12A:
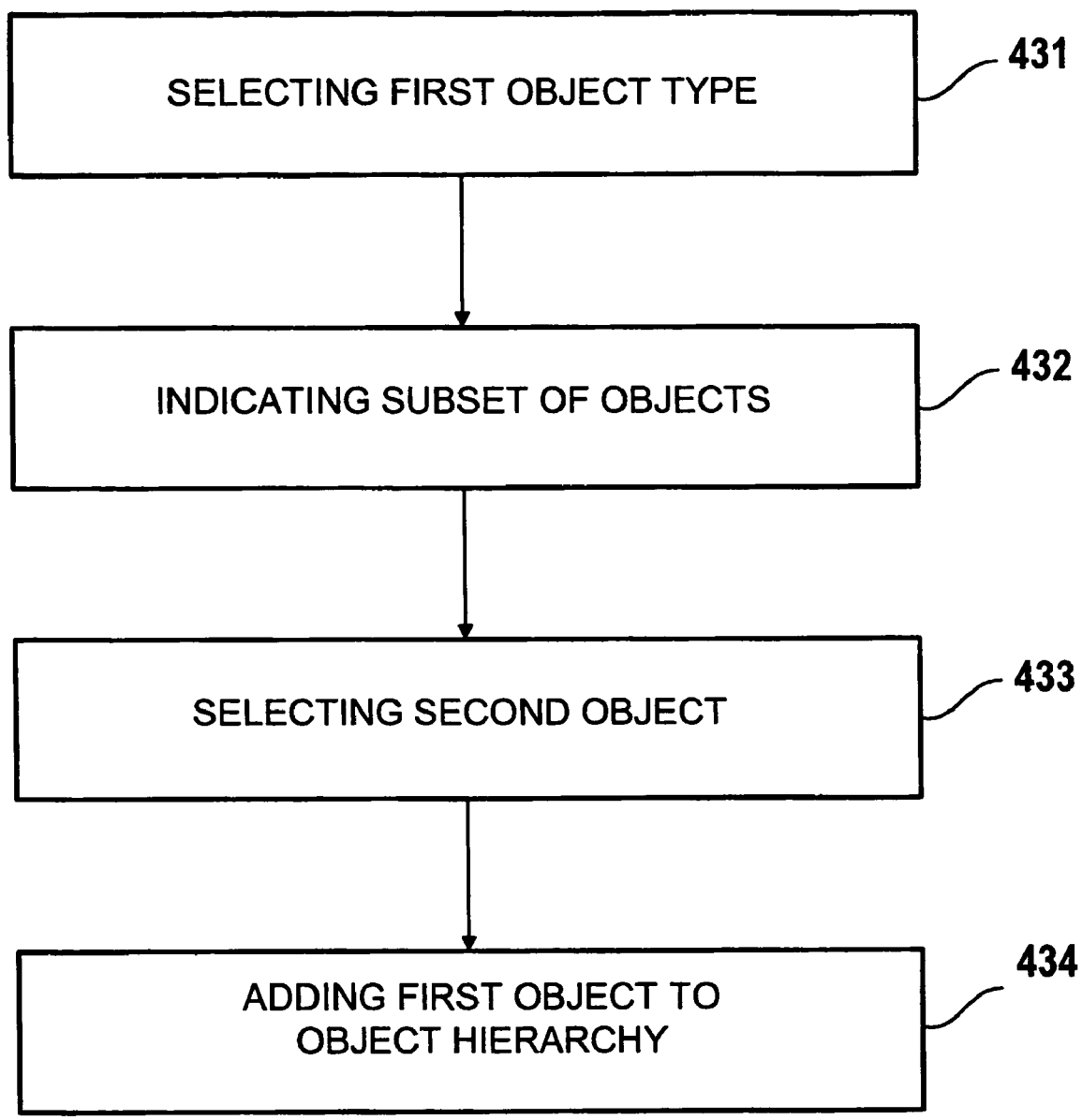
FIG. 12A illustrates details of one of the method steps of the first embodiment.

FIG. 12A illustrates details of the inserting 430 step of method 400 in the first embodiment. For example, first subset 130-1 of object types comprises parent (P) object type 131 assigned to first object type 131. Inserting 430 step comprises further steps selecting 431, indicating 432, selecting 433 and adding 434.

In the selecting 431 step, preferably, the user selects first object type 131 from the plurality of object types 131-134 in object type selector 130.

In the indicating 432 step computer system 999 indicates subset 110-1 of objects in object hierarchy 110 to the user. Subset 110-1 of objects comprises objects having an object type which is included in first subset 130-1 of object types.

In the selecting 433 step, preferably, the user selects second object 112 from subset 110-1 of objects as a parent (P) node for first object 111.

In the adding 434 step computer system 999 adds first object 111 as child of second object 112 to object hierarchy 110. The result is visualized on output device 950.

Figure 12B:
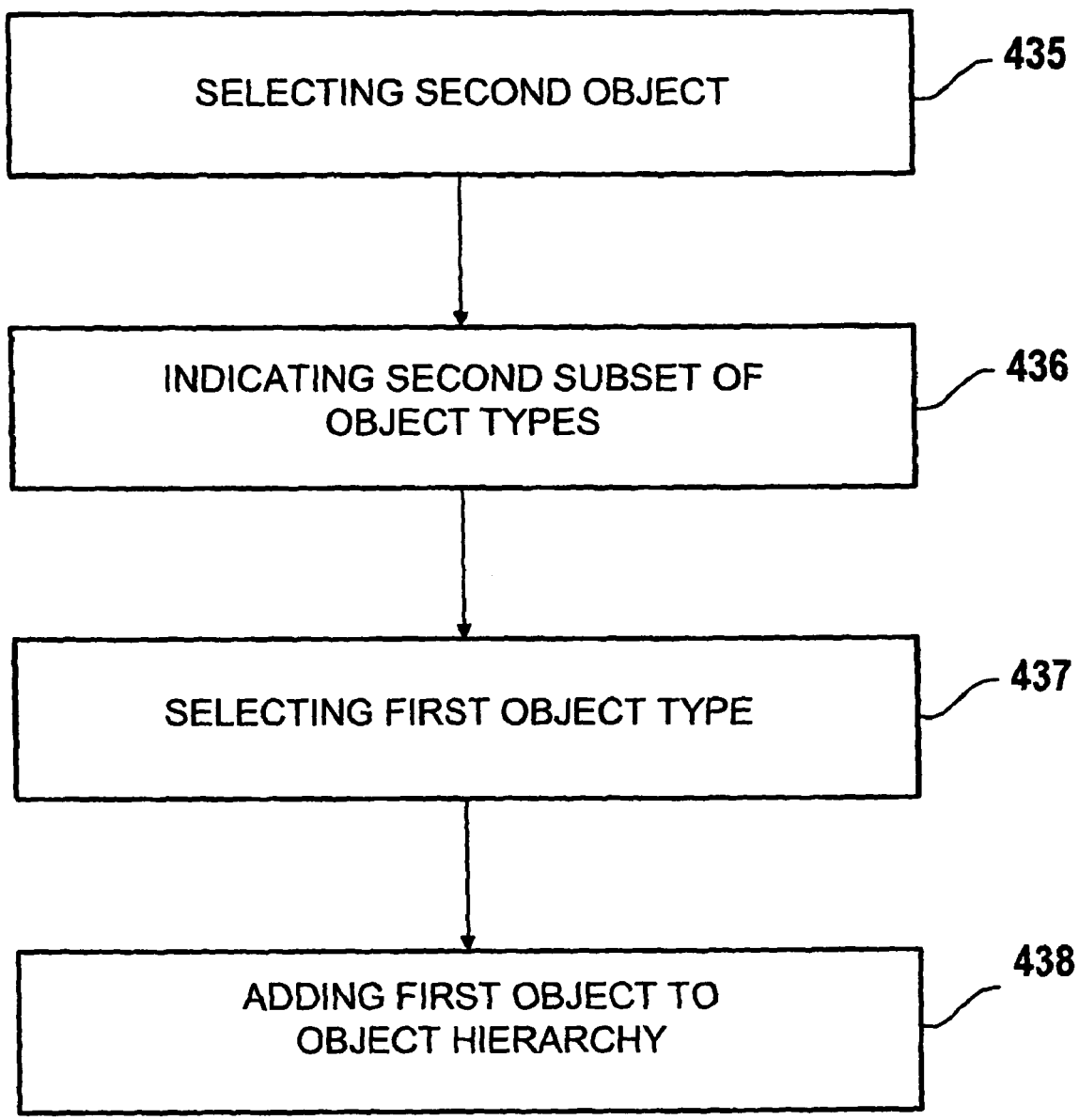
FIG. 12B illustrates details of one of the method steps of the second embodiment.

FIG. 12B illustrates details of the inserting 430 step of method 400 in the second embodiment. Second subset 130-2 of object types comprises child (c) object types 131, 132 assigned to second object type 132. Inserting step 430 comprises further steps selecting 435, indicating 436, selecting 437 and adding 438.

In the selecting 435 step, preferably, the user selects second object 112 within object hierarchy 110 as parent node for first object 131.

In the indicating 436 step, computer system 999 indicates second subset 130-2 of object types in object type selector 130.

In the selecting 437 step, preferably, the user selects first object type 131 from subset 130-2.

In the adding 438 step, computer system 999 adds first object 111 as child of second object 112 to object hierarchy 110. The result is visualized on output device 950.

Figure 13:
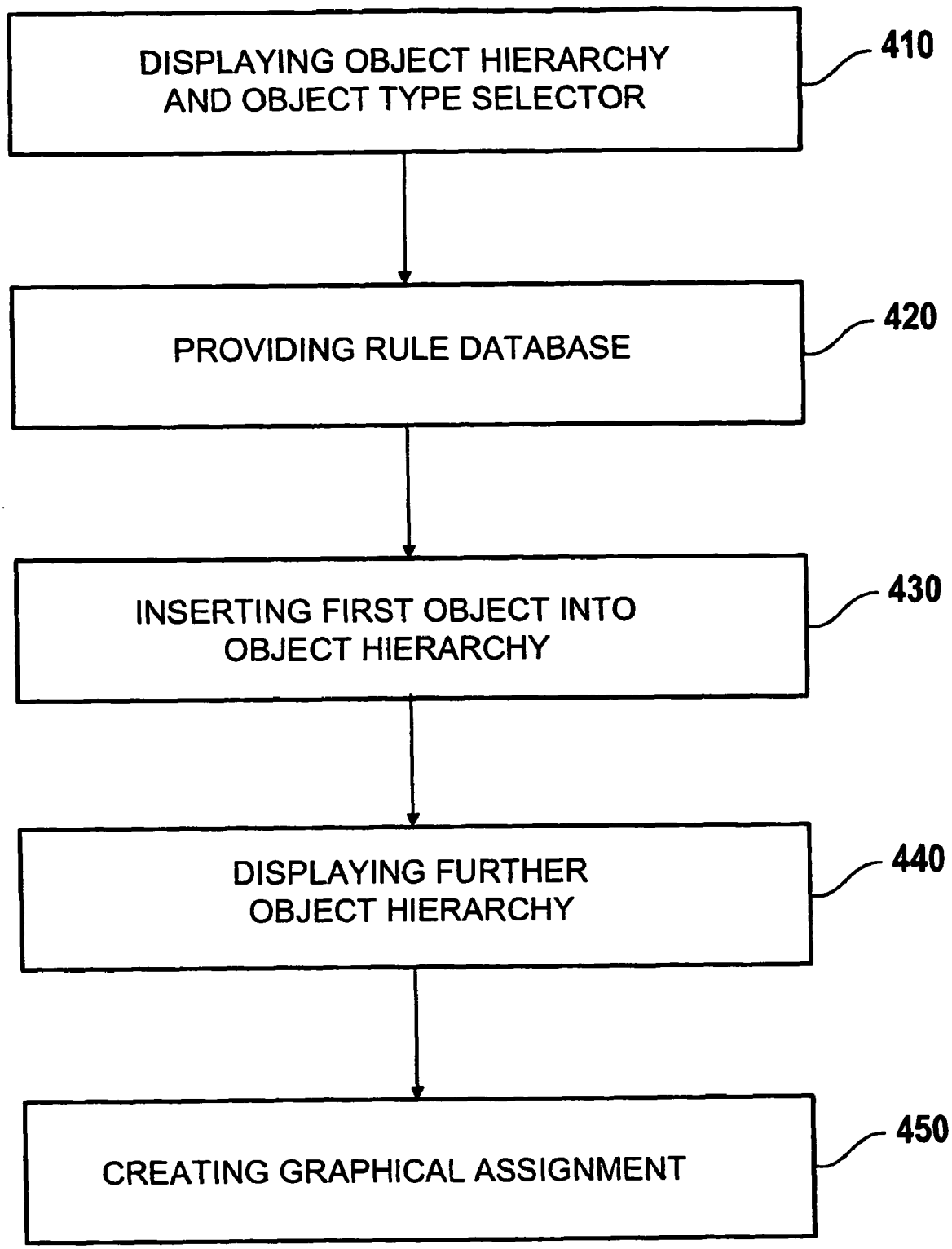
FIG. 13 illustrates further steps of the method when creating an object assignment between two object hierarchies.

FIG. 13 illustrates further steps displaying 440 and creating 450 of method 400 when creating object assignment 150 between two object hierarchies 110, 120. Preferably, steps 440 and 450 are performed after steps 410 to 430.

In the displaying 440 step, computer system 999 displays further predefined object hierarchy 120 on output device 950. Further object hierarchy 120 is similar to object hierarchy 110. Further object hierarchy 120 has a third object 121 that, for example, has third object type 133.

In the creating 450 step, graphical assignment 150 is created form first object 111 to third object 121 in accordance with one of the object type assignments 193, 194. Graphical assignment 150 is specified by assignment category 151 and assignment value 152.

Figure 14A:
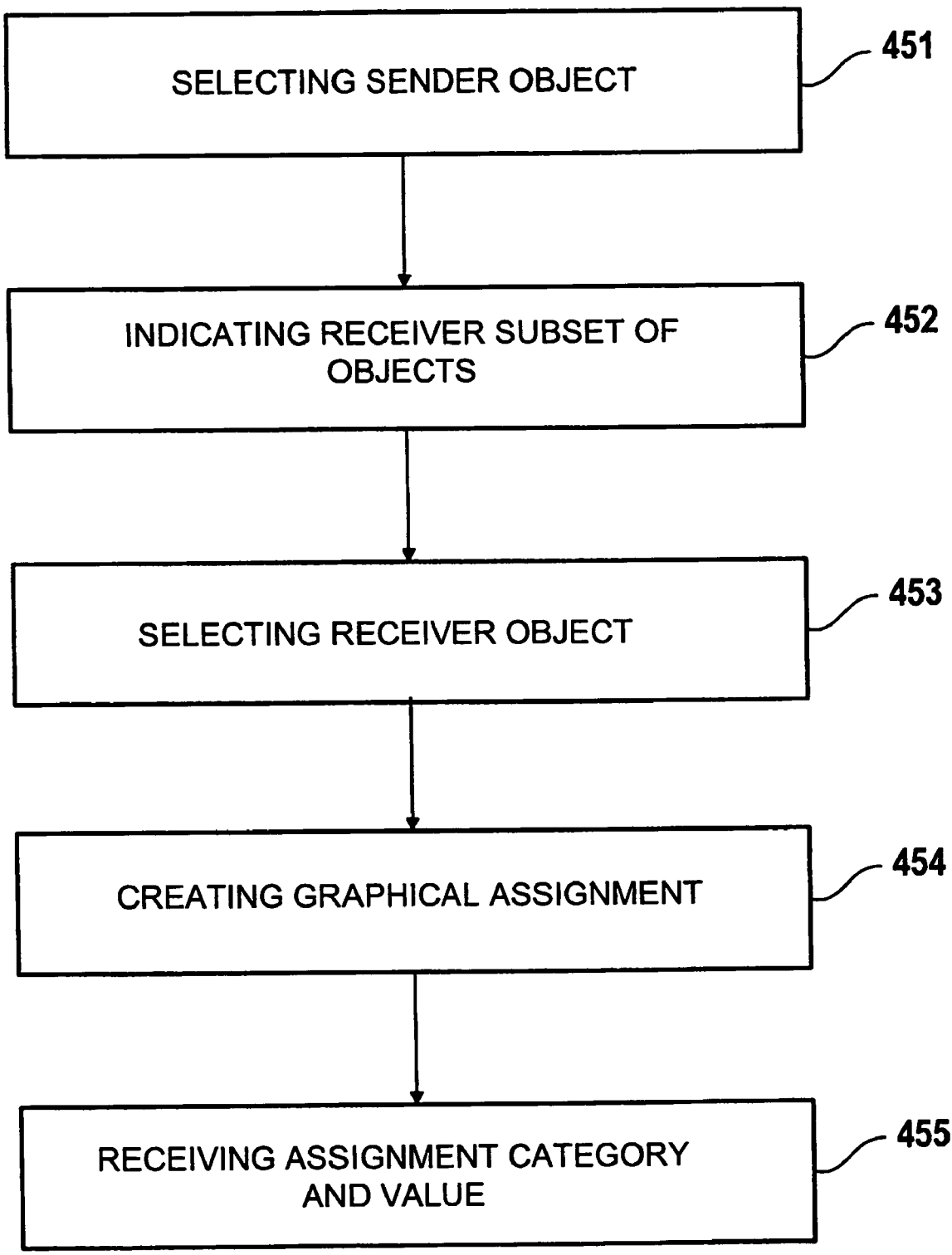
FIG. 14A illustrates details of one of the method steps of the third embodiment.

FIG. 14A illustrates details of creating step 450 of method 400 in the third embodiment. For example, third subset 130-3 comprises receiver object types assigned to first object type 133. Creating step 450 comprises further steps selecting 451, indicating 452, selecting 453, creating 454 and receiving 455.

In the selecting 451 step, for example, the user selects first object 111 as sender object of graphical assignment 150.

In the indicating 452 step, computer system 999 indicates receiver subset 120-1 of objects in further object hierarchy 120. Receiver subset 120-1 of objects comprises objects having a receiver object type which is included in third subset 130-3 of object types.

In the selecting 453 step, for example, the user selects third object 121 receiver subset 120-1 of objects as receiver object of graphical assignment 150.

In the creating 454 step, graphical assignment 150 is stored, preferably, in computer system 999 and visualized on output device 950.

In the receiving 455 step, computer system 999 receives assignment category 151 and assignment value 152 that specify the assignment 150. For example the user enters assignment category 151 and assignment value 152 via input device 940 or an application program of computer system 999 automatically provides the information.

Figure 14B:
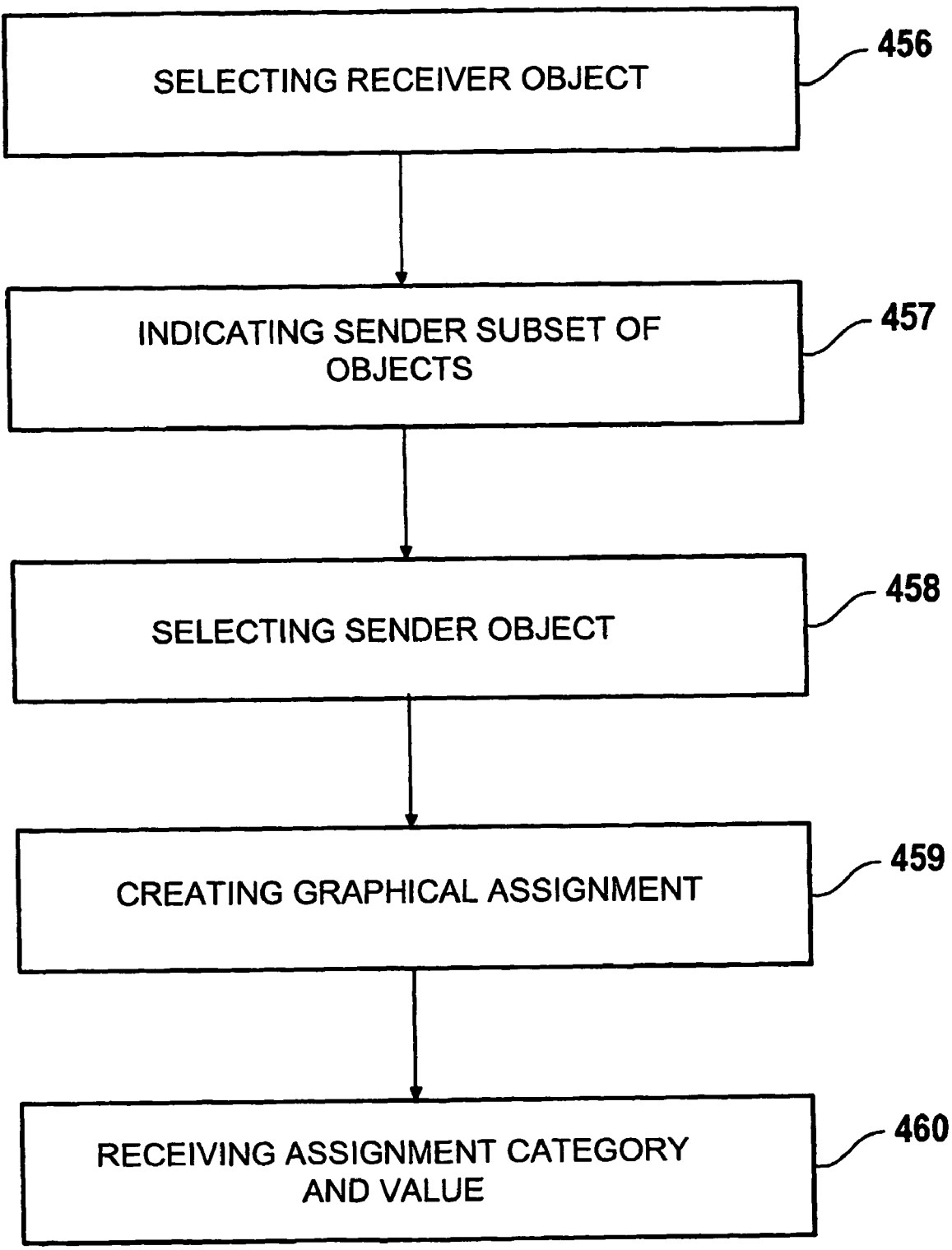
FIG. 14B illustrates details of one of the method steps of the forth embodiment.

FIG. 14B illustrates details of creating step 450 of method 400 in the forth embodiment. For example, forth subset 130-4 comprises sender object types assigned to third object type 133. Creating step 450 comprises the further steps selecting 456, indicating 457, selecting 458, creating 459 and receiving 460.

In the selecting 456 step, for example, the user selects third object 121 as receiver object of graphical assignment 150.

In the indicating 457 step, computer system 999 indicates sender subset 110-2 of objects in object hierarchy 110. Sender subset 110-2 of objects, preferably, comprises objects having a sender object type which is included in forth subset 130-4 of object types.

In the selecting 458 step, for example, the user selects first object 111 as sender object of the graphical assignment 150 from sender subset 110-2 of objects.

In the creating 459 step, graphical assignment 150 is stored, preferably, in computer system 999 and visualized on output device 950.

In the receiving 460 step, computer system 999 receives assignment category 151 and assignment value 152 that specify the assignment 150. For example the user enters assignment category 151 and assignment value 152 via input device 940 or an application program of computer system 999 automatically provides the information.

Figure 15:
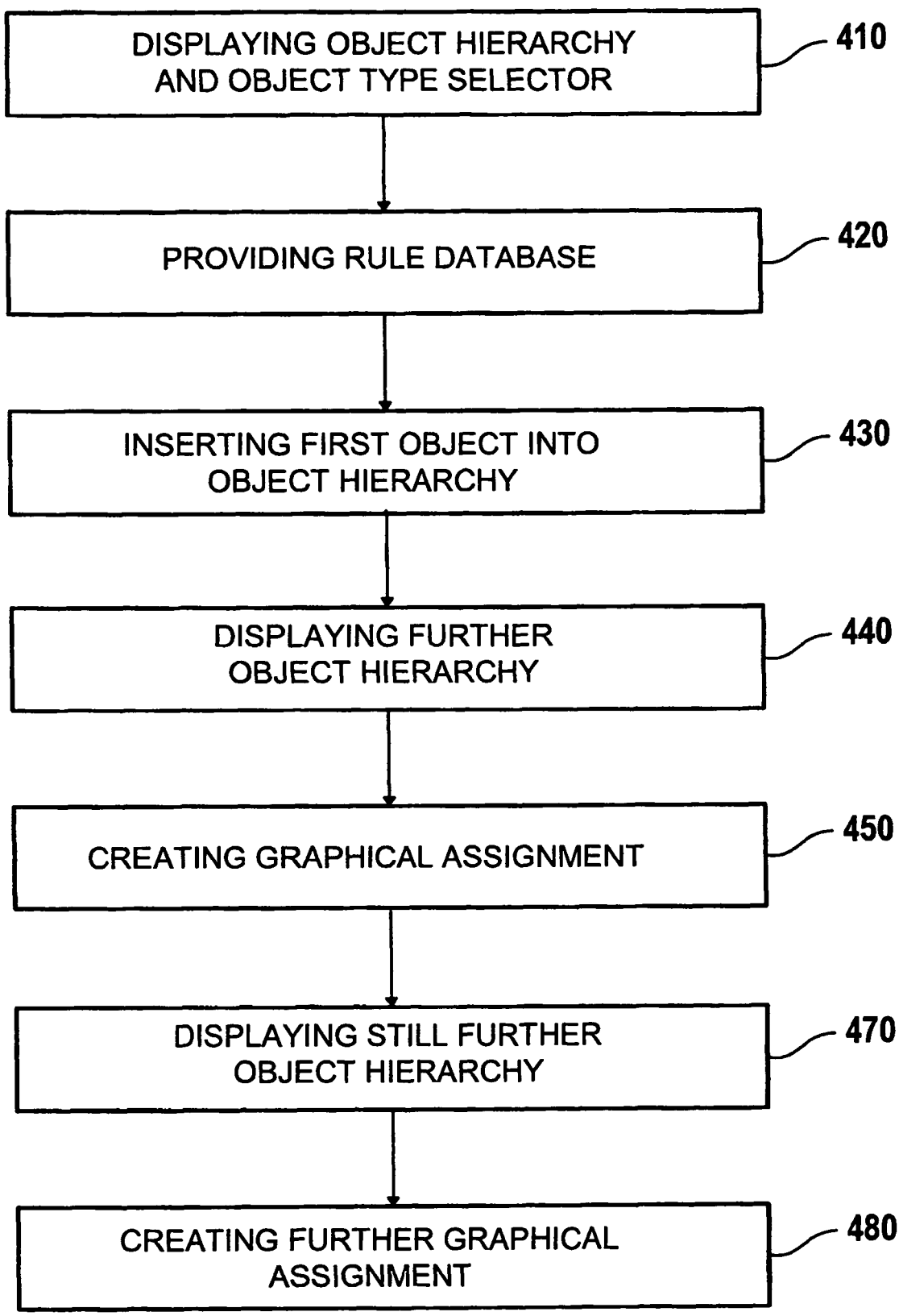
FIG. 15 illustrates further steps of the method when creating two object assignments between three object hierarchies.

FIG. 15 illustrates further steps displaying 470 and creating 480 of method 400 when creating two object assignments 150, 150-1 between three object hierarchies 110, 120, 120-10 (cf. FIG. 10). Preferably, steps 470 and 480 are performed after steps 410 to 450.

In the displaying 470 step, computer system 999 displays on output device 950 still further predefined object hierarchy 120-10 that is similar to object hierarchy 110. It is not important for the invention, where object hierarchy 120-10 is displayed on output device 950. However, it might be convenient for the user when object hierarchy 120-20 is displayed in such a way that all displayed object hierarchies 110, 120, 120-10 are lined up next to each other from left the left side of output device 950 to the right side.

In the creating 480 step, the user uses computer system 999 to create further graphical assignment 150-1 from an object of one other object hierarchy (e.g. 120) to an object of still further object hierarchy 120-10 in accordance with one of the object type assignments of rule database 190. Creating step 480 is performed similar to creating step 450. Further graphical assignment 150-1 (cf. FIG. 10) gets specified by further assignment category 151-1 and further assignment value 152-1 similar to the description of steps 455 and 460 (cf. FIGS. 11A, 11B).

Compared with prior art systems, the creation of graphical assignments between objects of more than two hierarchies provides significant advantages to the user. On the one hand, it allows the user to define "multilevel assignments" (as described under FIG. 10) with an "easy-to-use" graphical human interface; on the other hand the user gets a visualization of the graphical assignments, thus helping the user to selectively see specific assignments between specific objects in different object hierarchies rather than seeing a chaotic network of assignments. When combined with a "scrolling"-function to scroll a deliberate number of object hierarchies on output device 950, the user can use computer system 999 to define and visualize any complex multilevel-assignment between multiple hierarchies—always in accordance with object type assignments of rule database 950.

Figure 16:
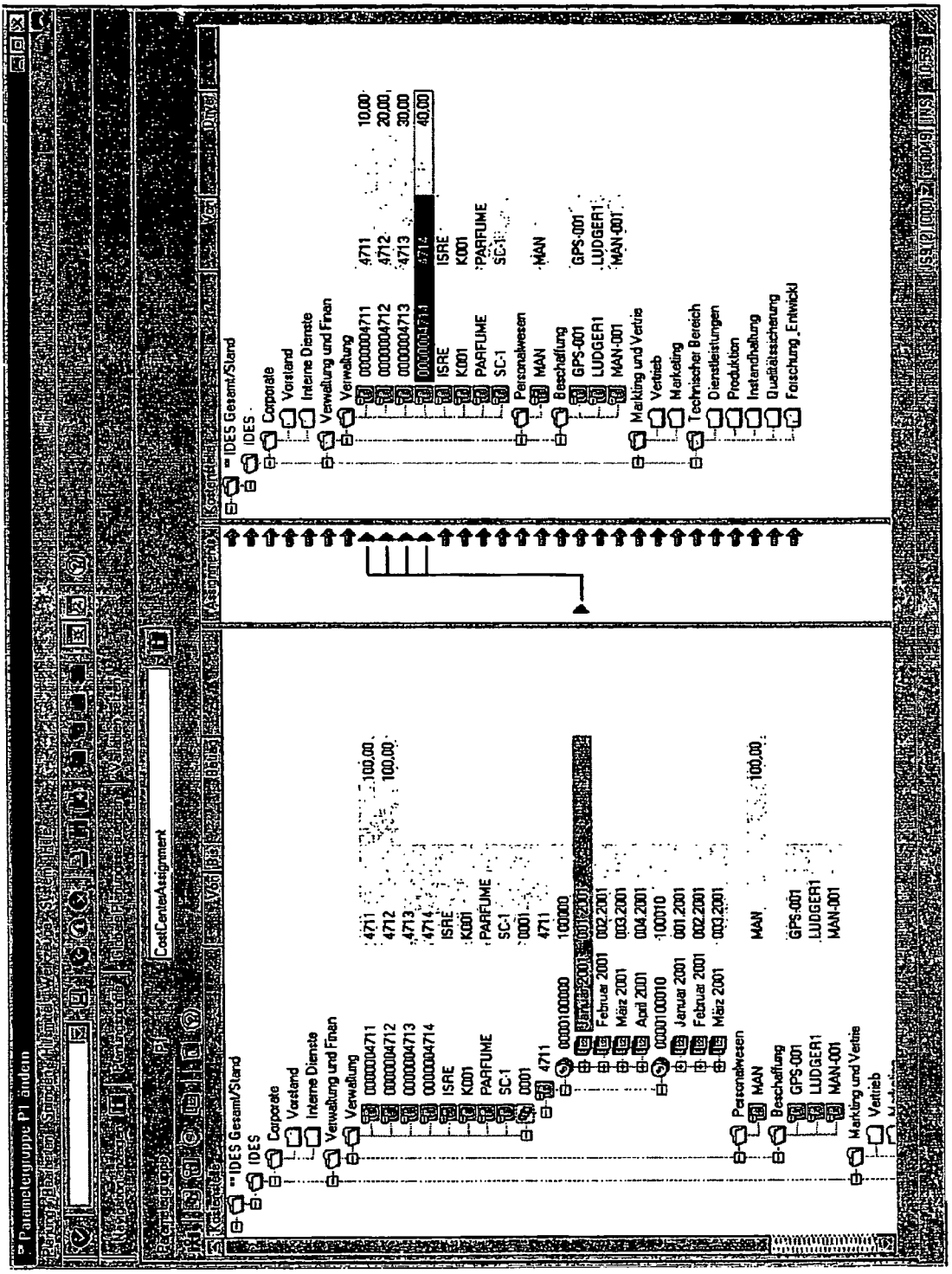
FIG. 16 illustrates a screen shot of a client computer screen according to the present invention.

FIG. 16 illustrates a screen shot of client computer screen 950 for creating assignments between objects of two hierarchies (left and right) according to the present invention. In the example, two cost center hierarchies are displayed next to each other. Both of the object hierarchies have objects of various object types (indicated by different icons). Assignments from objects of the left object hierarchy to objects of the right object hierarchy are visualized by arrows. An object type selector is displayed above the upper edge of the left object hierarchy, showing icons for the various object types. An assignment category ("CostCenterAssignment") is shown in a field that is to the right of the object type selector. An assignment value is shown for each assignment in the column "Driver" of the right object hierarchy.

After having described the present invention as computer-implemented method, it will now be described as computer system.

In a preferred embodiment, computer system 999 (cf. FIG. 1) for creating graphical assignments between objects according to the present invention comprises the following means:

A first means for displaying 410 predefined object hierarchy 110 and object type selector 130. Object type selector 130 provides a plurality of predefined object types 131-134. As used herein after the term "table" indicates an assignment structure that can either be stored permanently in computer system 999 or be created dynamically at runtime in a memory of computer system 999 (e.g., memory 921). Data can be retrieved from tables by conventional data retrieval programs that are typically part of the operating system and are known in the art.

For example, the first means can be implemented in the following way. Preferably, application server computer (e.g., 901; cf. FIG. 1) comprises a memory (e.g., 921) storing a first table that stores data (e.g., Object Hierarchy, Parent Node, Child Node) of object hierarchy 110 and a second table that stores the plurality of predefined object types 131-134 (e.g., Object Type Selector, Object Type, Object Type Name) of object type selector 130. The following tables are simplified views of first and second tables.

| First table: object hierarchies | | |
|---|---|---|
| Object Hierarchy | Parent Node | Child Node |
| 110 | 116 | 114 |
| 110 | 116 | 115 |
| 110 | 114 | 112 |
| 110 | 114 | 113 |

| Second table: object types | | |
|---|---|---|
| Object Type Selector | Object Type | Object Type Name |
| 130 | 131 | Diamond |
| 130 | 132 | Triangle |
| 130 | 133 | Square |
| 130 | 134 | Circle |

Object types in the second table can also be multidimensional object types according to FIG. 3. As an example, object type 135 is also stored as an object type that is available for object type selector 130.

| Second table: including multidimensional object types 135, 136 | | |
|---|---|---|
| Object Type Selector | Object Type | Object Type Name |
| 130 | 131 | Diamond |
| 130 | 132 | Triangle |
| 130 | 133 | Square |
| 130 | 134 | Circle |
| 130 | 135 | Circle for first square (FS) |
| 130 | 136 | Circle for squares |

For example, a person of skill in the art can implement the first and second tables using conventional database technology, such as a relational database management system (DBMS). It is not important for the invention that first and second tables are stored in memory 921 of server computer 901. They can be stored anywhere in computer system 999.

Preferably, client computer 900 (cf. FIG. 1) receives data of the first and second tables via network 990 and visualizes the data for the user on output device 950 (cf. FIG. 1) by using a conventional graphic display program in combination with processor 910 and memory 920. Preferably, the visualization of object hierarchy 110 is a tree structure, where the nodes of the tree structure are the objects of object hierarchy 110 (cf. FIG. 2). Preferably, each predefined object type 131-134 is visualized through a corresponding icon in object type selector 130. For convenience of the user and to make object hierarchy 110 more readable, preferably, each object of object hierarchy 110 is visualized by an icon that corresponds to the object type of the object.

A second means for providing 420 rule database 190. Rule database 190 stores for each object type 131-134 at least one predefined object type assignment 191-194 of a corresponding predefined subset 130-1, 130-2, 130-3, 130-4 of object types to the object type 131-134. Preferably, the second means is implemented as a third table (Assignment Type, Object Type, Subset of Object Types) of said DBMS on server computer 901 according to FIG. 3A.

| Third table: Rule Database | | |
|---|---|---|
| Assignment Type | Object Type | Subset of Object Types |
| P | 131 | 132 |
| C | 132 | 132, 131 |
| R | 131 | 132, 133 |
| S | 133 | 131, 133 |

A third means for inserting 430 first object 111 into object hierarchy 110 in accordance with one of the object type assignments (e.g. 191, 192; cf. FIG. 3A). For example, first object 111 has first object type 131 and is assigned to second object 112 having second object type 132.

Preferably, the third means is implemented in the following way. Input device 940 allows the user to control cursor 951 through client computer 900 and make selections of objects that are displayed on output device 950. Preferably, the user selects 435 (cf. FIG. 12B) second object 112 within object hierarchy 110 as parent node for first object 131 (e.g. by clicking on the object with cursor 951 and mouse 940). For example, object 112 has object type 132. Preferably, server computer 901 retrieves object type assignment 192 (cf. FIG. 3A) from rule database 190 that assigns subset 130-2 of object types to object type 132. Subset 130-2 comprises child object types 131, 132 (C) of object type 132.

Client computer 900 (cf. FIG. 2) receives second subset 130-2 via network 990 and indicates 436 (cf. FIG. 12B) second subset 130-2 of object types in object type selector 130 on output device 950. Preferably, this is achieved by highlighting object types 131, 132 of subset 130-2 in object type selector 130. Preferably, selected second object 112 is also highlighted in object hierarchy 110. A person of skill in the art can achieve highlighting, for example, by a conventional graphic display program of client computer 900, using colour or pattern effects for highlighted objects or in other ways as described under FIG. 4A. For instance, the user then selects 437 (cf. FIG. 12B) first object type 131 from subset 130-2 in object type selector 130 as the object type of object 111 (e.g. by clicking on object type 131).

Preferably, an application program of server computer 901 causes processor 911 (described under FIG. 1) and memory 921 to add first object 111 as child of second object 112 to the first table (object hierarchy 110).

| First table - after adding object 111 | | |
|---|---|---|
| Object Hierarchy | Parent Node | Child Node |
| 110 | 116 | 114 |
| 110 | 116 | 115 |
| 110 | 114 | 112 |
| 110 | 114 | 113 |
| 110 | 112 | 111 |

First object 111 is instantiated as an instance of selected first object type 131. Further the application program causes client computer 900 to visualize the result for the user on output device 950 by showing object 111 as child node of object 112 (cf. FIG. 5B.

Alternatively, the third means can be implemented by using the same components and tables of computer system 999 as described above but where the user firstly selects the object type (e.g. 131) and secondly selects the parent object (e.g. 112) according to the detailed description of FIGS. 6A and 6B.

In a further preferred embodiment, computer system 999 can be extended for creating graphical assignments between objects of two different hierarchies (e.g. 110, 120). In this case computer system 999 further comprises:

A forth means that is similar to the first means for displaying 440 a further predefined object hierarchy 120, which is similar to the object hierarchy 110. The forth means can be implemented in the following way. Preferably, the data of object hierarchy 120 are stored in the first table.

| First table - comprising two object hierarchies 110, 120 | | |
|---|---|---|
| Object Hierarchy | Parent Node | Child Node |
| 110 | 116 | 114 |
| 110 | 116 | 115 |
| 110 | 114 | 112 |
| 110 | 114 | 113 |
| 110 | 112 | 111 |
| 120 | 126 | 124 |
| 120 | 126 | 125 |
| 120 | 124 | 121 |
| 120 | 124 | 122 |
| 120 | 125 | 123 |

Server computer 901 retrieves the data of object hierarchy 120 from the first table (e.g., from memory 921) and provides the data to client computer 900 via network 990. Preferably, client computer 900 visualizes object hierarchy 120 to the user on output device 900. It is convenient for the user but not required for the present invention when further object hierarchy 120 is displayed either to the left or to the right of object hierarchy 110. In this example, object hierarchy 120 has at least a third object 121 that has a third object type 133.

A fifth means for creating 450 graphical assignment 150 from first object 111 to third object 121 in accordance with one of the object type assignments 193, 194. Graphical assignment 150 is specified by assignment category 151 and assignment value 152. The fifth means can be implemented in the following way. Object type assignment 193 (cf. FIG. 3A) assigning subset 130-3 of object types to first object type 131 is stored in the third table of rule database 190. In the example, subset 130-3 comprises receiver object types 132, 133 (R) of object type 131.

For example, the user selects 451 (cf. FIG. 14A) first object 111 as sender object of graphical assignment 150, preferably, by using input device 940 to click on first object 111 on output device 950. Server computer 901 retrieves third subset 130-3 of object types from the third table. An application program, preferably running on server computer 901, identifies receiver subset 120-1 of objects comprising objects 121, 123, 124, 125 having receiver object types 132, 133 of subset 130-3. Client computer 900 (cf. FIG. 2) receives receiver subset 120-1 via network 990 and indicates 452 (cf. FIG. 14A) receiver subset 120-1 of objects in further object hierarchy 120. Preferably, indicating 452 is achieved by highlighting objects 121, 123, 124, 125 or by displaying an assignment icon (e.g. a small arrow or a check box) next to each object of subset 120-1 with the conventional graphic display program of client computer 900. The user then selects 453 (cf. FIG. 11A) third object 121 from receiver subset 120-1 of objects as receiver object of graphical assignment 150 (e.g. by clicking on third object 121 or clicking on the assignment icon).

Preferably, server computer 901 adds assignment 150 from first object 111 to third object 121 to a forth table (cf. below) for storing assignments between hierarchies. It is not important for the invention, where the forth table is stored. Preferably, the forth table is stored in memory 921 of server computer 901 (cf. FIG. 1).

Preferably, client computer 900 visualizes the result for the user on output device 950. For example, assignment 150 is displayed as an arrow pointing from first object 111 to third object 121.

For example the user enters assignment category 151 and assignment value 152 via input device 940 to specify assignment 150 or an application program of computer system 999 automatically provides the information. Server computer 901 receives assignment category 151 and assignment value 152. For example, if assignment category 152 is "percentage (of total cost)" then assignment value 152 contains a percentage value, such as 20%. Assignment category 151 and assignment value 152 are stored together with the receiver and sender objects (110/111, 120/121) in the forth table for assignment 150. A simplified view of the forth table is shown below.

| | Forth table: Assignments between hierarchies | | | |
|---|---|---|---|---|
| Assignment | Sender: Object Hierarchy/ Object | Receiver: Object Hierarchy/ Object | Assignment Category | Assignment Value |
| 150 | 110/111 | 120/121 | Percentage (of total cost) | 20 |

Alternatively, the fifth means can be implemented by using the same components and tables of computer system 999 as described above but where the user firstly selects the receiver object (e.g. 121) and secondly selects the sender object (e.g. 111) according to the detailed description of FIGS. 9A and 9B.

In a still further preferred embodiment, computer system 999 can be extended for creating multiple graphical assignments between objects of more than two different hierarchies (e.g. 110, 120, 120-10). In this case computer system 999 further comprises:

A sixth means for displaying 470 still further predefined object hierarchy 120-10 that is similar to the object hierarchy 110. The sixth means is implemented similar to the forth means.

A seventh means for creating 480 further graphical assignment 150-1 from an object of one other object hierarchy (e.g. 120) to an object of still further object hierarchy 120-10 in accordance with one of the object type assignments of the third table. Further graphical assignment 150-1 is specified by further assignment category 151-1 and further assignment value 152-1. The seventh means is implemented similar to the fifth means. For example, after having created further graphical assignment 150-1 from object nnn in object hierarchy 120 to object mmm in object hierarchy 120-10 with assignment category 151-1 being xxx and assignment value 152-1 being yyy the forth table looks the like the following:

| | Forth table - after further assignment creation | | | |
|---|---|---|---|---|
| Assignment | Sender: Object Hierarchy/ Object | Receiver: Object Hierarchy/ Object | Assignment Category | Assignment Value |
| 150 | 110/111 | 120/121 | Percentage (of total cost) | 20 |
| 150-1 | 120/nnn | 120-10/mmm | xxx | yyy |

After having described the present invention as computer-implemented method and computer system, it will now be described as computer program product and computer readable medium.

In a preferred embodiment, computer program product 100/101 causes at least one processor (e.g., 910) to process a plurality of program instructions. In the example, processors 910, 911 perform the steps of:

Displaying 410 predefined object hierarchy 110 and object type selector 130, wherein object type selector 130 provides a plurality of predefined object types 131-134.

Providing 420 rule database 190. Rule database 190 stores for each object type 131-134 at least one predefined object type assignment (191-194) of a corresponding predefined subset (130-1, 130-2, 130-3, 130-4) of object types.

Inserting 430 first object 111 into object hierarchy 110 in accordance with one of the object type assignments (e.g. 191, 192). For example, first object 111 has first object type 131 and is assigned to second object 112 having second object type 132.

In a further preferred embodiment, computer program product 100/101 causes at least one processor (e.g., 910) to process a further plurality of program instructions. In this case, processors 910, 911 perform the steps of:

Displaying 440 further predefined object hierarchy 120 having third object 121 that has third object type 133. Further object hierarchy 120 is similar to object hierarchy 110.

Creating 450 graphical assignment 150 from first object 111 to third object 121 in accordance with one of the object type assignments (e.g. 193, 194). Graphical assignment 150 is specified by assignment category 151 and assignment value 152.

In a still further preferred embodiment, computer program product 100/101 causes at least one processor (e.g., 910) to process a still further plurality of program instructions. In this case, processors 910, 911 perform the steps of:

Displaying 470 still further predefined object hierarchy 120-10 that is similar to object hierarchy 110.

Creating 480 further graphical assignment 150-1 from an object of one other object hierarchy (e.g. 110, 120) to an object of still further object hierarchy 120-10 in accordance with one of the object type assignments. Further graphical assignment 150-1 is specified by further assignment category 151-1 and further assignment value 152-1.

In all of the preferred embodiments, the computer program product is causing at least one processor (e.g., 910) to provide further predefined object types 135, 136 that result, for example, from a combination of predefined object type 134 with object instance 119 of any predefined object type (e.g. 133) or from a combination of object type 134 with any other object type (e.g. 133), respectively.

The present invention can also be defined as computer readable medium, embodying program instructions causing at least one processor (e.g., 910) to execute the three embodiments of computer program product 100/101.

The invention claimed is:

1. A computer-implemented method for creating graphical assignments between objects, the method comprising:
    storing a rule database that includes one or more tables that define object type assignments between a plurality of object types, the object type assignments defining, one or more object types that are assigned to at least one of the plurality of the object types;
    displaying a first object hierarchy including a plurality of objects that include at least one sender object for sending data to a receiver object, at least one of the plurality of objects in the first object hierarchy being displayed as a root of another of the displayed plurality of objects in the first object hierarchy;
    displaying, simultaneously with the displayed first object hierarchy, a second object hierarchy including a plurality of objects that include said receiver object for receiving data from said at least one sender object, at least one of the plurality of objects in the second object hierarchy being displayed as a root of another of the displayed plurality of objects in the second object hierarchy;
    receiving a selection of a first object from the displayed first object hierarchy, the selected first object having a first object type;
    based on the selected first object and the object type assignments stored in the rule database, indicating in the displayed second object hierarchy, which of the plurality of objects in the displayed second object hierarchy have object types assigned to the first object type and are thus capable of being assigned to the first object, and which of the plurality of objects in the displayed second object hierarchy have object types not assigned to the first object type and are thus not capable of being assigned to the selected first object; and
    creating an assignment between the selected first object of the first object type displayed in the first object hierarchy and a second object displayed in the second object hierarchy, including creating a graphical assignment between the selected first object of the first object type displayed in the first object hierarchy and the second object displayed in the second object hierarchy, the second object having an object type assigned to the first object type.

2. The method of claim 1, further comprising:
    creating the assignment between the first object and the second object by further specifying an assignment category and an assignment value.

3. The method of claim 1, wherein the second object hierarchy includes objects having receiver object types assigned to the first object type, and
    the indicating step comprises:
    indicating in the displayed second object hierarchy which of the objects in the second object hierarchy are part of a receiver subset of objects, wherein the receiver subset of objects comprises objects having a receiver object type; and
    the creating step comprises:
    selecting the first object as a sender object of the assignment;
    selecting, from the receiver subset of objects, the second object as a receiver object of the assignment;
    creating the graphical assignment; and
    receiving an assignment category and an assignment value.

4. The method of claim 1, wherein the objects indicated as capable of being assigned to the first object are highlighted, and the objects indicated as not capable of being assigned to the first object are not highlighted.

5. The method of claim 1, further comprising:
    displaying an object type selector that displays a plurality of object types, the object type selector being displayed simultaneously with the first object hierarchy and the second object hierarchy;
    selecting from the object type selector one of the plurality of object types;
    indicating in the displayed first object hierarchy a subset of objects having object types assigned to the selected object type; and
    inserting a third object having the selected object type into the first object hierarchy by assigning the third object to a fourth object in the subset of objects having object types assigned to the selected object type.

6. The method of claim 5, wherein the inserting step further comprises:
    selecting the third object as a child node for the fourth object; and
    adding the third object as a child of the fourth object to the first object hierarchy.

7. The method of claim 5, wherein the inserting step further comprises:
    selecting the third object as parent node for the fourth object; and
    adding the third object as a parent of the fourth object to the first object hierarchy.

8. he method of claim 1, further comprising:
    simultaneously displaying a third object hierarchy with the first object hierarchy and the second object hierarchy; and
    creating a further graphical assignment from an object included in at least one of the displayed first and second object hierarchies to an object included in the third object hierarchy.

9. A computer system, comprising:
    a memory storing a rule database that includes one or more tables that define object type assignments between a plurality of object types the object type assignments defining one or more object types that are assigned to at least one of the plurality of object types;
    a display for simultaneously displaying a first object hierarchy and a second object hierarchy, the displayed first and second object hierarchies each including a plurality of objects that include at least one sender object in the first object hierarchy for sending data to a receiver object in the second object hierarchy, wherein at least one of the plurality of objects in the first object hierarchy is displayed as a root of another of the plurality of objects displayed in the first object hierarchy, and at least one of the plurality of objects in the second object hierarchy is displayed as a root of another of the plurality of objects displayed in the second object hierarchy;

an input device for selecting, from the displayed first object hierarchy, a first object having a first object type;

the display indicating in the displayed second object hierarchy and based on the selected first object type and an object type assignment stored in the rule database for the selected first object type, which of the plurality of objects in the displayed second object hierarchy have object types assigned to the first object type and are thus capable of being assigned to the selected first object, and which of the plurality of objects in the displayed second object hierarchy have object types not assigned to the first object type and are thus not capable of being assigned to the selected first object; and an input device for creating an assignment between the selected first object of the first object type displayed in the first object hierarchy and a second object displayed in the second object hierarchy, the assignment including a graphical assignment between the selected first object of the first object type displayed in the first object hierarchy and the second object displayed in the second object hierarchy, the second object having an object type assigned to the first object type.

10. The computer system of claim 9, wherein the second object hierarchy includes objects having receiver object types assigned to the first object type, and the display further indicates in the displayed second object hierarchy which of the objects in the second object hierarchy are part of a receiver subset of objects, wherein the receiver subset of objects comprises objects having a receiver object type; and the input device further permits a user to select the first object as a sender object of the assignment, select from the receiver subset of objects the second object as a receiver object of the assignment, create the graphical assignment, and input an assignment category and an assignment value.

11. The computer system of claim 9, wherein the display is for further displaying, simultaneously with the first object hierarchy and the second object hierarchy, an object type selector that displays a plurality of object types, the computer system further comprising:

an input device for selecting from the object type selector one of the plurality of object types;

an indication in the displayed first object hierarchy of a subset of objects having object types assigned to the selected object type; and an input device for inserting a third object having the selected object type into the first object hierarchy by assigning the third object to a fourth object in the subset of objects having object types assigned to the selected object type.

12. The computer system of claim 9, further comprising:

a display for displaying a third object hierarchy simultaneously with the first object hierarchy and the second object hierarchy; and an input device for creating a further graphical assignment from an object included in at least one of the displayed first and second object hierarchies to an object included in the third object hierarchy.

13. The computer system of claim 9, further comprising an object type resulting from a combination of at least two of a plurality of predefined object types.

14. A computer-readable medium having computer readable program instructions stored thereon, the program instructions stored on the computer readable medium, when executed, instructing at least one processor to execute the steps of:

storing in a rule database information that includes one or more tables that define object type assignments between a plurality of object types, the object type assignments defining one or more object types that are assigned to at least one of the plurality of object types;

displaying a first object hierarchy including a plurality of objects that include at least one sender object for sending data to a receiver object, at least one of the plurality of objects in the first object hierarchy being displayed as a root of another of the displayed plurality of objects in the first object hierarchy;

displaying, simultaneously with the displayed first object hierarchy, a second object hierarchy including a plurality of objects that include said receiver object for receiving data from said at least one sender object, at least one of the plurality of objects in the second object hierarchy being displayed as a root of another of the displayed plurality of objects in the second object hierarchy;

receiving a selection of a first object from the displayed first object hierarchy, the selected first object having a first object type;

based on the selected first object and the object type assignments stored in the rule database, indicating in the displayed second object hierarchy, which of the plurality of objects in the displayed second object hierarchy have object types assigned to the first object type and are thus capable of being assigned to the selected first object type, and which of the plurality of objects in the displayed second object hierarchy have object types not assigned to the first object type and are thus not capable of being assigned to the selected first object; and creating an assignment between the selected first object of the first object type displayed in the first object hierarchy and a second object displayed in the second object hierarchy, including creating a graphical assignment between the selected first object of the first object type displayed in the first object hierarchy and the second object displayed in the second object hierarchy, the second object having an object type assigned to the first object type.

15. The computer readable medium of claim 14, the program instructions, when executed, further instructing the at least one processor to execute the further steps of:

simultaneously displaying a third object hierarchy with the first object hierarchy and the second object hierarchy; and creating a further graphical assignment from an object included in at least one of the displayed first and second object hierarchies to an object included in the third object hierarchy.

16. The computer readable medium of claim 14, the program instructions, when executed, further instructing the at least one processor to execute the further steps of:

displaying an object type selector that displays a plurality of object types, the object type selector being displayed simultaneously with the first object hierarchy and the second hierarchy;

receiving a selection, using the object type selector, of one of the plurality of object types;

indicating in the displayed first object hierarchy a subset of objects having object types assigned to the selected object type; and inserting a third object having the selected object type into the first object hierarchy by assigning the third object to a fourth object in the subset of objects having object types assigned to the selected object type.

17. The computer readable medium of claim 14, the program instructions, when executed, further instructing the at least one processor to execute the further steps of:

creating predefined object type resulting from a combination of at least two of the plurality of object types.

18. A computer-implemented method for creating assignments between objects, the method comprising:

storing a rule database that includes one or more tables that define object type assignments between a plurality of object types, the object type assignments defining one or more object types that are assigned to at least one of the plurality of object types;

displaying a first object hierarchy as a first displayed hierarchical list, the first displayed hierarchical list including a plurality of icons for a plurality of corresponding objects, each corresponding object having an object type, wherein at least one of the plurality of icons in the first object hierarchy is displayed as a root of another of the displayed plurality of icons in the first object hierarchy;

simultaneously displaying a second object hierarchy as a second displayed hierarchical list, the second displayed hierarchical list including a plurality of icons for a plurality of corresponding objects, each corresponding object having an object type, wherein at least one of the plurality of icons in the second object hierarchy is displayed as a root of another of the displayed plurality of icons in the second object hierarchy;

receiving a selection of a first object from the first displayed hierarchical list, the selected first object having a first object type;

based on the selected first object and the object type assignments stored in the rule database indicating in the second displayed hierarchical list, which of the plurality of objects in the second displayed hierarchical list have object types assigned to the first object type and thus capable of being assigned to the selected first object, and which of the plurality of objects in the second displayed hierarchical list have object types not assigned to the first object type and are thus not capable of being assigned to the selected first object; and creating an assignment between the selected first object displayed in the first displayed hierarchical list and a second object displayed in the second displayed hierarchical list, the second object having an object type assigned to the first object type.

19. The computer-implemented method of claim 18, wherein the indicating step further includes:

graphically indicating a first set of the plurality of objects in the second displayed hierarchical list having object types assigned to the first object type; and graphically indicating a second set of the plurality of objects in the second displayed hierarchical list, having object types assigned to the first object type.

20. The computer-implemented method of claim 18, wherein creating an assignment includes:

creating a graphical assignment between the first object displayed in the first displayed hierarchical list and the second object displayed in the second displayed hierarchical list; and specifying an assignment category and an assignment value for the assignment.

* * * * *